United States Patent
Shibata et al.

(10) Patent No.: US 11,639,138 B2
(45) Date of Patent: May 2, 2023

(54) VEHICLE DISPLAY SYSTEM AND VEHICLE

(71) Applicant: KOITO MANUFACTURING CO., LTD., Tokyo (JP)

(72) Inventors: Yoshinori Shibata, Shizuoka (JP); Misako Kamiya, Shizuoka (JP); Naoki Takii, Shizuoka (JP); Masaaki Nakabayashi, Shizuoka (JP); Yoshiaki Fushimi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/266,271

(22) PCT Filed: Aug. 2, 2019

(86) PCT No.: PCT/JP2019/030579
§ 371 (c)(1),
(2) Date: Feb. 5, 2021

(87) PCT Pub. No.: WO2020/031915
PCT Pub. Date: Feb. 13, 2020

(65) Prior Publication Data
US 2021/0300259 A1      Sep. 30, 2021

(30) Foreign Application Priority Data

Aug. 6, 2018   (JP) .............................. JP2018-147734
Aug. 15, 2018  (JP) .............................. JP2018-152957

(51) Int. Cl.
*G09G 5/00* (2006.01)
*B60R 11/02* (2006.01)
(Continued)

(52) U.S. Cl.
CPC ............ *B60R 11/0229* (2013.01); *B60R 1/12* (2013.01); *G02B 27/0101* (2013.01);
(Continued)

(58) Field of Classification Search
CPC .................. B60R 11/0229; B60R 1/12; B60R 2001/1253; G02B 27/0101
(Continued)

(56) References Cited

U.S. PATENT DOCUMENTS 10,067,341 B1 * 9/2018 Breed .................. G06V 20/597
2006/0244829 A1 * 11/2006 Kato .................... H04N 5/2624
348/148

(Continued)

FOREIGN PATENT DOCUMENTS

DE  102015202846 A1   8/2015
DE  102015109132 A1   12/2016
(Continued)

OTHER PUBLICATIONS

European Partial Search Report issued in corresponding European Application No. 19848437.0, dated Sep. 15, 2021.
(Continued)

*Primary Examiner* — Jonathan M Blancha
(74) *Attorney, Agent, or Firm* — Osha Bergman Watanabe & Burton LLP

(57) ABSTRACT

A display system is provided in a vehicle and includes: an HUD positioned inside the vehicle and configured so as to display, on the vehicle window, a surrounding environment video indicating the environment surrounding the vehicle; and a display control unit controlling the HUD such that the surrounding environment video is displayed on the window in accordance with prescribed conditions associated to the vehicle or the environment surrounding the vehicle and configured so as to reduce the transmittance of the window.

15 Claims, 18 Drawing Sheets

(51) Int. Cl.
*B60R 1/12* (2006.01)
*G02B 27/01* (2006.01)

(52) U.S. Cl.
CPC . *B60R 2001/1253* (2013.01); *B60R 2300/205* (2013.01); *G02B 2027/014* (2013.01); *G02B 2027/0163* (2013.01); *G02B 2027/0196* (2013.01)

(58) Field of Classification Search
USPC .............................................................. 345/7
See application file for complete search history.

(56) References Cited

U.S. PATENT DOCUMENTS

| 2010/0066925 | A1 | 3/2010 | Nagahara et al. |
| 2015/0232030 | A1 | 8/2015 | Bongwald |
| 2017/0021765 | A1 | 1/2017 | Mori et al. |
| 2017/0140651 | A1* | 5/2017 | Lee ...................... G01C 21/365 |
| 2017/0334455 | A1* | 11/2017 | Asakura ..................... B60J 3/04 |
| 2017/0337821 | A1 | 11/2017 | Masuda et al. |
| 2018/0056851 | A1 | 3/2018 | Kim et al. |
| 2018/0065552 | A1 | 3/2018 | Mori et al. |
| 2018/0079284 | A1* | 3/2018 | Choi ...................... G02F 1/0121 |
| 2018/0118095 | A1* | 5/2018 | Kunii ..................... B60Q 1/085 |
| 2018/0180439 | A1 | 6/2018 | Akhtar et al. |
| 2018/0272934 | A1 | 9/2018 | Mori et al. |
| 2018/0312111 | A1 | 11/2018 | Bongwald |
| 2019/0025580 | A1 | 1/2019 | Nagano et al. |
| 2019/0051185 | A1 | 2/2019 | Masuda et al. |
| 2019/0082123 | A1 | 3/2019 | Yamada |
| 2020/0064640 | A1 | 2/2020 | Nagano et al. |

FOREIGN PATENT DOCUMENTS

| EP | 3192698 A1 | 7/2017 |
| JP | H09277887 A | 10/1997 |
| JP | 2005219583 A | 8/2005 |
| JP | 200845870 A | 2/2008 |
| JP | 2010072365 A | 4/2010 |
| JP | 2015069111 A | 4/2015 |
| JP | 2016055691 A | 4/2016 |
| JP | 2016135629 A | 7/2016 |
| JP | 201726417 A | 2/2017 |
| JP | 2017056909 A | 3/2017 |
| JP | 2017206196 A | 11/2017 |
| WO | 2017134861 A1 | 8/2017 |
| WO | 2018016119 A1 | 1/2018 |

OTHER PUBLICATIONS

International Search Report issued in corresponding International Application No. PCT/JP2019/030579; dated Oct. 8, 2019 (5 pages).
Written Opinion of the International Searching Authority issued in corresponding International Application No. PCT/JP2019/030579; dated Oct. 8, 2019 (4 pages).
Extended European Search Report issued in European Application No. 21208081.6, dated Feb. 8, 2022 (7 pages).

* cited by examiner

FIG.7

| EXAMPLES OF PREDETERMINED CONDITION ASSOCIATED WITH VEHICLE OR SURROUNDING ENVIRONMENT OF VEHICLE |
|---|
| WHEN LIGHT PATTERN IS EMITTED ONTO ROAD SURFACE |
| WHEN DRIVING MODE OF VEHICLE IS ADVANCED DRIVING SUPPORT MODE OR FULLY AUTOMATED DRIVING MODE |
| WHEN BRIGHTNESS OF SURROUNDING ENVIRONMENT OF VEHICLE IS EQUAL TO OR SMALLER THAN FIRST BRIGHTNESS |
| WHEN BRIGHTNESS OF SURROUNDING ENVIRONMENT OF VEHICLE IS EQUAL TO OR LARGER THAN SECOND BRIGHTNESS |
| WHEN ROAD ON WHICH VEHICLE IS CURRENTLY TRAVELING IS AUTOMATED DRIVING VEHICLE DEDICATED ROAD |
| WHEN WEATHER AT CURRENT POSITION OF VEHICLE IS BAD WEATHER |

VEHICLE DISPLAY SYSTEM AND VEHICLE

TECHNICAL FIELD

The present disclosure relates to a vehicle display system and a vehicle including the vehicle display system.

BACKGROUND ART

Currently, research on an automated driving technology for an automobile is actively carried out in each country, and legislation for allowing a vehicle (Hereinafter, the "vehicle" refers to the automobile.) to travel on a public road in an automated driving mode is being studied in each country. Here, in the automated driving mode, a vehicle system automatically controls traveling of the vehicle. Specifically, in the automated driving mode, the vehicle system automatically performs at least one of steering control (control of a traveling direction of the vehicle), brake control and accelerator control (control of vehicle braking and acceleration/deceleration) based on information (surrounding environment information) indicating a surrounding environment of the vehicle obtained from a sensor such as a camera or a radar (for example, a laser radar or a millimeter wave radar). In contrast, in a manual driving mode described below, a driver controls the traveling of the vehicle, as is a case with many related-art vehicles. Specifically, in the manual driving mode, the traveling of the vehicle is controlled according to an operation of the driver (a steering operation, a brake operation and an accelerator operation), and the vehicle system does not automatically perform the steering control, the brake control and the accelerator control. A driving mode of the vehicle is not a concept existing only in some vehicles, but a concept existing in all vehicles including the related-art vehicles not having an automated driving function, and is classified according to, for example, a vehicle control method.

Therefore, the vehicle traveling in the automated driving mode (hereinafter, appropriately referred to as an "automated driving vehicle") and the vehicle traveling in the manual driving mode (hereinafter, appropriately referred to as a "manual driving vehicle") are expected to coexist on the public road in the future.

As an example of the automated driving technology, Patent Literature 1 discloses an automated following traveling system in which a following vehicle automatically follows a preceding vehicle. In the automated following traveling system, each of the preceding vehicle and the following vehicle includes a lighting system, and character information for preventing other vehicles from interrupting between the preceding vehicle and the following vehicle is displayed on the lighting system of the preceding vehicle, and character information indicating that the following vehicle automatically follows the preceding vehicle is displayed on the lighting system of the following vehicle.

There is also known a vehicle display system in which vehicle information is notified and warned to a driver (an occupant) himself/herself or others such as a pedestrian or an oncoming vehicle by radiating (drawing) a light pattern such as a figure or a character on a road surface (Patent Literature 2).

Patent Literature 1: JP H9-277887 A
Patent Literature 2: JP 2016-55691 A

SUMMARY OF INVENTION

It is conceivable that visibility of a surrounding environment of a vehicle to an occupant may decrease depending on a situation such as the surrounding environment of the vehicle. For example, when weather at a current position of the vehicle is bad weather such as heavy rain, the surrounding environment of the vehicle may not be sufficiently visible in a field of view directly visible to the occupant through a window of the vehicle (hereinafter, referred to as a direct field of view). In this case, the occupant may not notice presence of an object such as a pedestrian present ahead of the vehicle in the direct field of view. When a white light pattern is drawn on a road surface, it is assumed that it is difficult for the occupant to view the light pattern drawn on the road surface due to snow accumulated on the road surface.

As described above, there is room for improvement when the visibility the surrounding environment of the vehicle to the occupant decreases depending on the situation such as the surrounding environment of the vehicle.

An object of the present disclosure is to provide a vehicle display system and a vehicle capable of preventing a decrease in visibility of a surrounding environment of the vehicle to an occupant. Another object of the present disclosure is to provide a vehicle display system and a vehicle capable of realizing rich visual communication between an occupant and the vehicle.

A vehicle display system according to an aspect of the present disclosure provided in a vehicle, includes:

a first display device located inside the vehicle and configured to display a surrounding environment image indicating a surrounding environment of the vehicle on a window of the vehicle; and a display control unit configured to control the first display device such that the surrounding environment image is displayed on the window and lower a transmittance of the window according to a predetermined condition associated with the vehicle or the surrounding environment of the vehicle.

According to the above configuration, the surrounding environment image is displayed on the window according to the predetermined condition associated with the vehicle or the surrounding environment of the vehicle, and the transmittance of the window is lowered. In this way, according to the predetermined condition, an occupant can view the surrounding environment of the vehicle through the surrounding environment image instead of a direct field of view, and a decrease in visibility of the surrounding environment of the vehicle to the occupant can be prevented.

The first display device may be configured to display the surrounding environment image of a traveling direction of the vehicle on a front window of the vehicle.

According to the above configuration, the surrounding environment image in the traveling direction of the vehicle is displayed on the front window of the vehicle. Therefore, for example, when the vehicle is moving backward, the surrounding environment image behind the vehicle is displayed on the front window of the vehicle. In this way, the decrease in visibility of the surrounding environment of the vehicle to the occupant can be prevented.

The first display device may be configured to display the surrounding environment image on all windows of the vehicle and lower a transmittance of each of all the windows.

According to the above configuration, the surrounding environment image is displayed on all the windows (particularly, the front window, side windows and a back window) of the vehicle, and the transmittance of each of all the windows is lowered. In this way, the occupant can view the surrounding environment of the vehicle through the surrounding environment image displayed on all the windows, and the decrease in visibility of the surrounding environment of the vehicle to the occupant can be prevented.

The vehicle display system may further include a second display device configured to emit a light pattern toward a road surface outside the vehicle.

When the second display device emits the light pattern toward the road surface, the display control unit may control the first display device such that the surrounding environment image is displayed on the window, and lower, and lower the transmittance of the window.

According to the above configuration, when the light pattern is emitted toward the road surface, the occupant can view the surrounding environment of the vehicle through the surrounding environment image instead of the direct field of view.

The display control unit may control the first display device such that the surrounding environment image is displayed on the window and lower the transmittance of the window according to a driving mode of the vehicle.

According to the above configuration, according to the driving mode of the vehicle, the occupant can view the surrounding environment of the vehicle through the surrounding environment image instead of the direct field of view.

The display control unit may control the first display device such that the surrounding environment image is displayed on the window and lower the transmittance of the window according to a brightness of the surrounding environment of the vehicle.

According to the above configuration, the occupant can view the surrounding environment of the vehicle through the surrounding environment image instead of the direct field of view depending on the brightness of the surrounding environment of the vehicle.

The display control unit may control the first display device such that the surrounding environment image is displayed on the window and lower the transmittance of the window according to a road on which the vehicle is currently traveling.

According to the above configuration, according to the road on which the vehicle is currently traveling, the occupant can view the surrounding environment of the vehicle through the surrounding environment image instead of the direct field of view.

The display control unit may control the first display device such that the surrounding environment image is displayed on the window and lower the transmittance of the window according to weather at a current position of the vehicle.

According to the above configuration, according to the weather at the current position of the vehicle, the occupant can view the surrounding environment of the vehicle through the surrounding environment image instead of the direct field of view. In particular, when the weather at the current position of the vehicle is bad weather, the decrease in visibility of the surrounding environment of the vehicle to the occupant can be prevented through the surrounding environment image.

A vehicle display system according to another aspect of the present disclosure provided in a vehicle, includes:

a first display device configured to emit a light pattern indicating predetermined information toward a road surface outside the vehicle;

a second display device located inside the vehicle and configured to display vehicle traveling information on traveling of the vehicle toward an occupant of the vehicle such that the vehicle traveling information is superimposed on a real space outside the vehicle; and a display control unit configured to cause information displayed by one of the first display device and the second display device to be displayed by another of the first display device and the second display device based on information on the vehicle or information on a surrounding environment of the vehicle.

According to the above configuration, the display control unit causes the information displayed by one of the first display device and the second display device to be displayed by another of the first display device and the second display device based on the information on the vehicle or the information on the surrounding environment of the vehicle. Therefore, when it is difficult for the occupant to recognize the information displayed by the first display device or the second display device, the information can be displayed by another of the second display device or the first display device. This makes it possible to further improve visibility of the information presented by the vehicle to the occupant. In this way, it is possible to provide the vehicle display system capable of realizing rich visual communication between the occupant and the vehicle.

The display control unit may cause the second display device to display the predetermined information based on the information on the vehicle or the information on the surrounding environment of the vehicle.

According to the above configuration, the display control unit causes the second display device to display the predetermined information based on the information on the vehicle or the information on the surrounding environment of the vehicle. Therefore, when it is difficult for the occupant to recognize the information displayed by the first display device, the information can be displayed by the second display device. This makes it possible to further improve the visibility of the information presented by the vehicle to the occupant.

The display control unit may cause the first display device to display the vehicle traveling information based on the information on the vehicle or the information on the surrounding environment of the vehicle.

According to the above configuration, the display control unit causes the first display device to display the vehicle traveling information based on the information on the vehicle or the information on the surrounding environment of the vehicle. Therefore, when it is difficult for the occupant to recognize the information displayed by the second display device, the information can be displayed by the first display device. This makes it possible to further improve the visibility of the information presented by the vehicle to the occupant.

The predetermined information may include a plurality of pieces of information, and the display control unit may cause the second display device to display a part of the predetermined information based on the information on the vehicle or the information on the surrounding environment of the vehicle.

According to the above configuration, the display control unit causes the second display device to display a part of the predetermined information based on the information on the vehicle or the information on the surrounding environment of the vehicle. Therefore, the information that is difficult for the occupant to recognize in of the information displayed by the first display device can be displayed by the second display device. This makes it possible to further improve the visibility of the information presented by the vehicle to the occupant.

The information on the vehicle may refer to information on a driving mode of the vehicle.

According to the above configuration, the display control unit causes the information displayed by one of the first display device and the second display device to be displayed by another of the first display device and the second display device based on the driving mode of the vehicle. Therefore, the display device can be switched according to a level of the driving mode.

The information on the surrounding environment of the vehicle may refer to brightness information of the surrounding environment, road information on the road on which the vehicle is currently traveling, or weather information at a current position of the vehicle.

According to the above configuration, the display control unit causes the information displayed by one of the first display device and the second display device to be displayed on another of the first display device and the second display device based on the brightness information of the surrounding environment, the road information on the road on which the vehicle is currently traveling, or the weather information at the current position of the vehicle. Therefore, the display device can be switched according to a situation of the surrounding environment of the own vehicle.

A vehicle including the vehicle display system may be provided.

According to the above, it is possible to provide the vehicle capable of preventing the decrease in visibility of the surrounding environment of the vehicle to the occupant.

According to the present disclosure, it is possible to provide a vehicle display system and a vehicle capable of preventing a decrease in visibility of a surrounding environment of the vehicle to an occupant. In addition, it is possible to provide a vehicle capable of realizing rich visual communication between an occupant and the vehicle.

BRIEF DESCRIPTION OF DRAWINGS

FIG. 7 is a table showing a specific example of a predetermined condition shown in the flowchart in FIG. 4.

Figure 1:
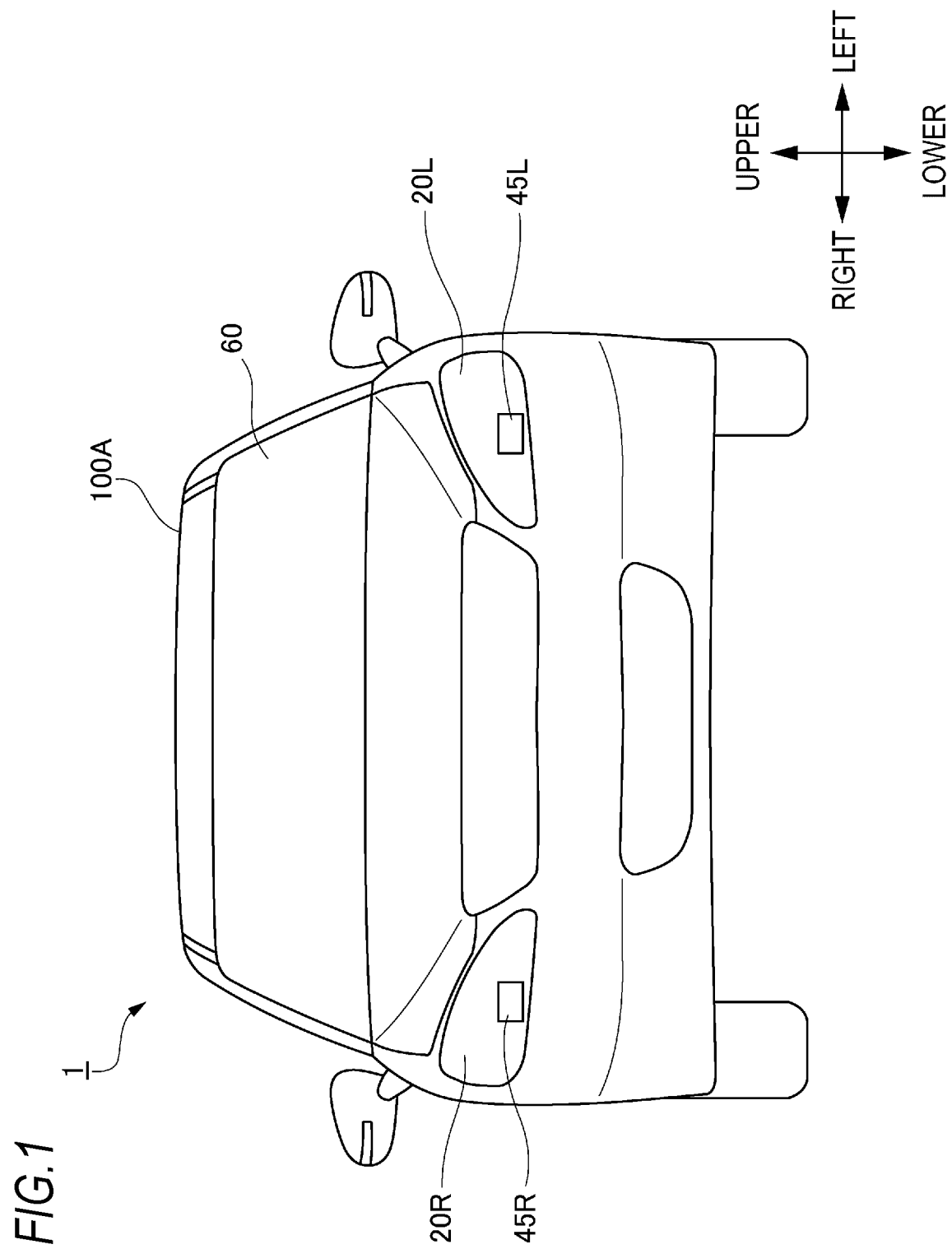
FIG. 1 is a front view of a vehicle equipped with a vehicle system according to a first embodiment of the present invention.

DESCRIPTION OF EMBODIMENTS (First embodiment) Hereinafter, a first embodiment of the present invention (hereinafter, referred to as the present embodiment) will be described with reference to the drawings. Dimensions of members shown in the drawings may be different from actual dimensions of the members for convenience of description.

In description of the present embodiment, a "left-right direction", an "upper-lower direction" and a "front-rear direction" may be appropriately referred to, for convenience of description. These directions are relative directions set for a vehicle 1 shown in FIG. 1. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 1, the front-rear direction is the direction orthogonal to the left-right direction and the upper-lower direction.

Figure 2:
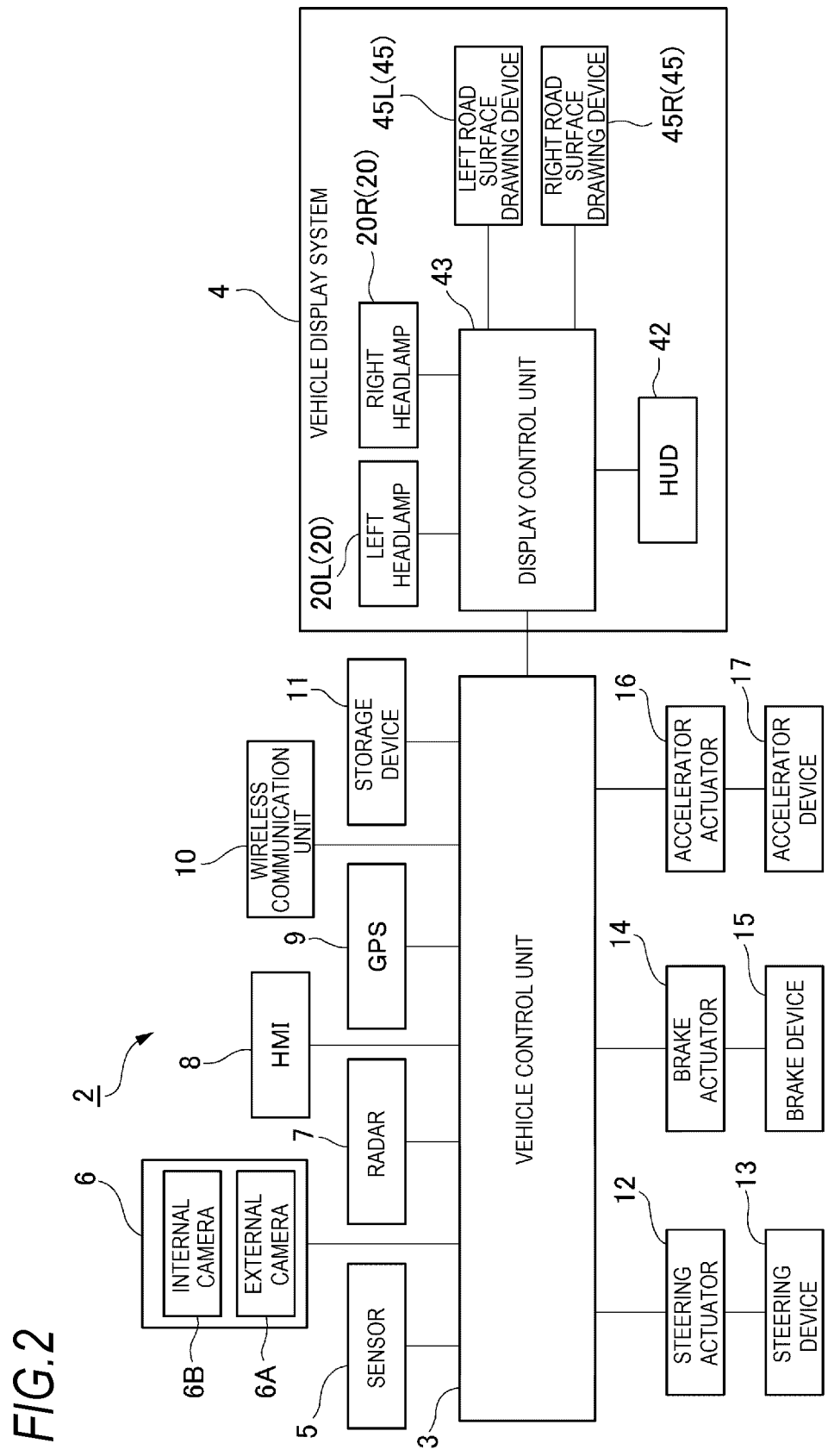
FIG. 2 is a block diagram of the vehicle system according to the first embodiment.

First, a vehicle system 2 according to the present embodiment will be described with reference to FIGS. 1 and 2. FIG. 1 is a front view of the vehicle 1 equipped with the vehicle system 2. FIG. 2 is a block diagram of the vehicle system 2. The vehicle 1 is a vehicle (an automobile) capable of traveling in an automated driving mode.

As shown in FIG. 2, the vehicle system 2 includes a vehicle control unit 3, a vehicle display system 4 (hereinafter, simply referred to as a "display system 4"), a sensor 5, a camera 6 and a radar 7. The vehicle system 2 further includes a human machine interface (HMI) 8, a global positioning system (GPS) 9, a wireless communication unit 10, a storage device 11, a steering actuator 12, a steering device 13, a brake actuator 14, a brake device 15, an accelerator actuator 16 and an accelerator device 17.

The vehicle control unit 3 is configured to control traveling of the vehicle 1. The vehicle control unit 3, for example, includes at least one electronic control unit (ECU). The electronic control unit includes a computer system (for example, a system on a chip (SoC)) including one or more processors and one or more memories, and an electronic circuit including an active element such as a transistor and a passive element. The processor includes, for example, at least one of a central processing unit (CPU), a micro processing unit (MPU), a graphics processing unit (GPU) and a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program (a trained model) constructed by supervised or unsupervised machine learning (particularly, deep learning) using a multilayer neural network. The RAM may temporarily store a vehicle control program, vehicle control data and/or surrounding environment information indicating a surrounding environment of the vehicle. The processor may be configured to develop a program designated from various vehicle control programs stored in the ROM on the RAM and execute various types of processing in cooperation with the RAM. The computer system may include a non-Neumann type computer such as an application specific integrated circuit (ASIC) or a field-programmable gate array (FPGA). Further, the computer system may include a combination of a Neumann type computer and a non-Neumann type computer.

The display system 4 includes a left headlamp 20L, a right headlamp 20R, a left road surface drawing device 45L and a right road surface drawing device 45R. The display system 4 further includes a head-up display (HUD) 42 and a display control unit 43.

As shown in FIG. 1, the left headlamp 20L is disposed on a left front surface of the vehicle 1, and includes a low beam lamp configured to irradiate ahead of the vehicle 1 with a low beam, and a high beam lamp configured to irradiate ahead of the vehicle 1 with a high beam. The right headlamp 20R is disposed on a right front surface of the vehicle 1, and includes a low beam lamp configured to irradiate ahead of the vehicle 1 with a low beam, and a high beam lamp configured to irradiate ahead of the vehicle 1 with a high beam. Each of the low beam lamp and the high beam lamp includes one or more light emitting elements such as light emitting diodes (LED) or laser diodes (LD), and an optical member such as a lens and a reflector. Hereinafter, the left head lamp 20L and the right headlamp 20R may be collectively referred to simply as the headlamp 20 for convenience of description.

The left road surface drawing device 45L (an example of a first display device) is disposed in a lamp chamber of the left headlamp 20L. The left road surface drawing device 45L is configured to emit a light pattern toward a road surface outside the vehicle 1. The left road surface drawing device 45L includes, for example, a light source unit, a drive mirror, an optical system such as a lens and a mirror, a light source drive circuit, and a mirror drive circuit. The light source unit is a laser light source or an LED light source. For example, the laser light source is RGB laser light sources configured to respectively emit red laser light, green laser light and blue laser light. The drive mirror is, for example, a micro electro mechanical systems (MEMS) mirror, a digital mirror device (DMD), a galvanometer mirror, a polygon mirror or the like. The light source drive circuit is configured to control driving of the light source unit. The light source drive circuit is configured to generate a control signal for controlling an operation of the light source unit based on a signal related to a predetermined light pattern transmitted from the display control unit 43, and then transmit the generated control signal to the light source unit. The mirror drive circuit is configured to control driving of the drive mirror. The mirror drive circuit is configured to generate a control signal for controlling an operation of the drive mirror based on a signal related to a predetermined light pattern transmitted from the display control unit 43, and then transmit the generated control signal to the drive mirror. When the light source unit is the RGB laser light sources, the left road surface drawing device 45L can draw light patterns of various colors on the road surface by performing scanning with laser light.

The right road surface drawing device 45R is disposed in a lamp chamber of the right headlamp 20R. The right road surface drawing device 45R is configured to emit a light pattern toward the road surface outside the vehicle 1. Similarly to the left road surface drawing device 45L, the right road surface drawing device 45R includes a light source unit, a drive mirror, an optical system such as a lens, a light source drive circuit, and a mirror drive circuit.

A drawing method of the left road surface drawing device 45L and the right road surface drawing device 45R may be a raster scan method, a digital light processing (DLP) method or a liquid crystal on silicon (LCOS) method. When the DLP method or the LCOS method is adopted, the light source unit may be the LED light source. A projection method may be adopted as a drawing method of the left road surface drawing device 45L and the right road surface drawing device 45R. When the projection method is adopted, the light source unit may be a plurality of LED light sources arranged in a matrix. In the present embodiment, the left road surface drawing device 45L and the right road surface drawing device 45R may be disposed on a vehicle body roof 100A. In this respect, one road surface drawing device may be disposed on the vehicle body roof 100A. Hereinafter, for convenience of description, the left road surface drawing device 45L and the right road surface drawing device 45R may be collectively referred to simply as the road surface drawing device 45. In the following description, the road surface drawing device 45 indicates the left road surface drawing device 45L, the right road surface drawing device 45R, or a combination of the left road surface drawing device 45L and the right road surface drawing device 45R.

Figure 3:
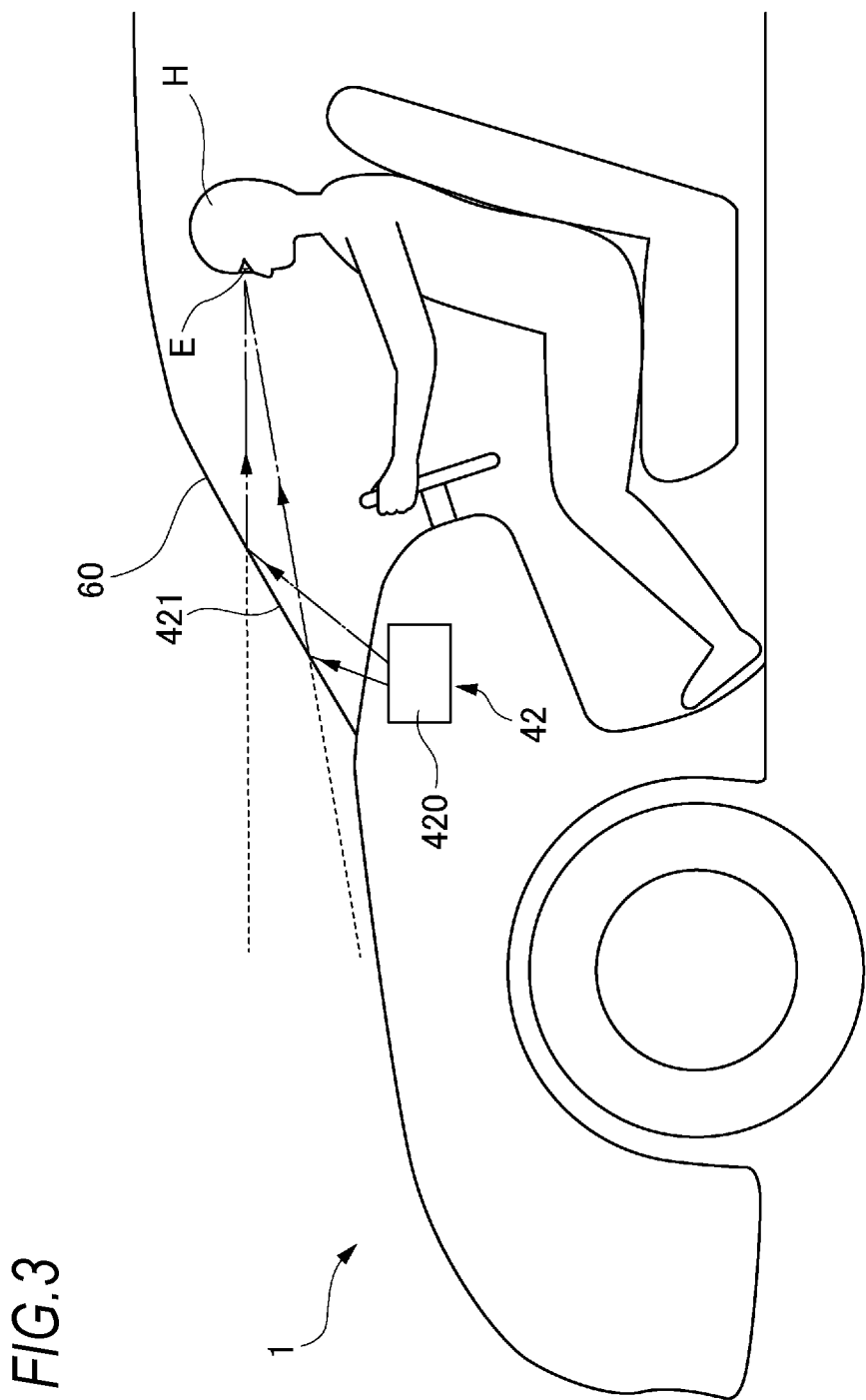
FIG. 3 is a view showing a state in which light emitted from a head-up display (HUD) reaches eyes of an occupant.

The HUD 42 (an example of a second display device) is located inside the vehicle 1. Specifically, the HUD 42 is installed at a predetermined position inside the vehicle 1. For example, as shown in FIG. 3, the HUD 42 may be disposed in a dashboard of the vehicle 1. The HUD 42 functions as a visual interface between the vehicle 1 and an occupant H. The HUD 42 is configured to display predetermined information (hereinafter, referred to as HUD information) toward the occupant H such that the HUD information is superimposed on a real space outside the vehicle 1 (particularly, the surrounding environment ahead of the vehicle 1). In this way, the HUD 42 functions as an augmented reality (AR) display. The HUD information displayed by the HUD 42 is, for example, vehicle traveling information on the traveling of the vehicle 1 and/or the surrounding environment information on the surrounding environment of the vehicle 1 (particularly, information related to an object present outside the vehicle 1). As will be described later, the HUD 42 is configured to display a surrounding environment image indicating the surrounding environment of the vehicle 1 captured by an external camera 6A.

As shown in FIG. 3, the HUD 42 includes a HUD main body 420 and a transparent screen 421. The HUD main body 420 includes a light source unit, a drive mirror, an optical system, a light source drive circuit and a mirror drive circuit. The light source unit is, for example, a laser light source or an LED light source. The laser light source is, for example, RGB laser light sources configured to respectively emit red laser light, green laser light and blue laser light. The drive mirror is, for example, a MEMS mirror, a DMD, a galvanometer mirror, a polygon mirror or the like. The optical system includes at least one of a prism, a lens, a diffusion plate, and a magnifying glass. The light source drive circuit is configured to control driving of the light source unit. The light source drive circuit is configured to generate a control signal for controlling an operation of the light source unit based on image data transmitted from the display control unit 43, and then transmit the generated control signal to the light source unit. The mirror drive circuit is configured to control driving of the drive mirror. The mirror drive circuit is configured to generate a control signal for controlling an operation of the drive mirror based on image data transmitted from the display control unit 43, and then transmit the generated control signal to the drive mirror.

The transparent screen 421 includes a part of a front window 60. The transparent screen 421 has a HUD display area D1 where the HUD information is displayed (see FIG. 6). Light (an image) emitted from the HUD main body 420 is radiated to the HUD display area D1 of the transparent screen 421. Next, the HUD display area D1 reflects the light emitted from the HUD main body 420 toward a viewpoint E of the occupant H. As a result, the occupant H recognizes the light (the image) emitted from the HUD main body 420 as a virtual image formed at a predetermined position ahead of the transparent screen 421. In this way, as a result of the HUD information (the image) displayed by the HUD 42 being superimposed on the real space ahead of the vehicle 1, the occupant H can feel that the HUD information is floating on a road.

The transparent screen 421 may be configured as a transparent combiner separated from the front window 60. Even in this case, the combiner has the HUD display area. Further, the occupant H recognizes the light (the image) emitted from the HUD main body 420 as the virtual image formed at a predetermined position ahead of the combiner. The position where the virtual image is formed (a virtual image formation position) may be changed by adjusting a position of the optical system of the HUD 42 (particularly, a focal length of a projection optical system). In this respect, the display control unit 43 can control the HUD 42 such that a position of the object ahead of the vehicle 1 and the virtual image formation position substantially coincide with each other. A drawing method of the HUD 42 may be a raster scan method, a DLP method or an LCOS method. When the DLP method or the LCOS method is adopted, the light source unit of the HUD 42 may be an LED light source.

The display control unit 43 is configured to control operations of the road surface drawing device 45 (specifically, the left road surface drawing device 45L and the right road surface drawing device 45R), the headlamp 20 (specifically, the left headlamp 20L and the right headlamp 20R), and the HUD 42. In this respect, the display control unit 43 is configured to control the operation of the road surface drawing device 45 (specifically, the left road surface drawing device 45L and the right road surface drawing device 45R) such that the light pattern is radiated to a predetermined position on the road surface. The display control unit 43 is configured to control the operation of the HUD 42 such that the HUD information is displayed in the HUD display area D1.

The display control unit 43 includes an electronic control unit (ECU). The electronic control unit includes a computer system (for example, an SoC) including one or more processors and one or more memories, and an electronic circuit including an active element such as a transistor and a passive element. The processor includes at least one of a CPU, an MPU, a GPU and a TPU. The memory includes a ROM and a RAM. The computer system may include a non-Neumann type computer such as an ASIC or an FPGA.

In the present embodiment, the vehicle control unit 3 and the display control unit 43 are provided as separate components, but the vehicle control unit 3 and the display control unit 43 may be integrally configured. In this respect, the display control unit 43 and the vehicle control unit 3 may be formed of a single electronic control unit. The display control unit 43 may include two electronic control units: an electronic control unit configured to control the operations of the headlamp 20 and the road surface drawing device 45, and an electronic control unit configured to control the operation of the HUD 42.

The sensor 5 includes at least one of an acceleration sensor, a speed sensor and a gyro sensor. The sensor 5 is configured to detect a traveling state of the vehicle 1 and output traveling state information to the vehicle control unit 3. The sensor 5 may include at least one of a seating sensor, a face orientation sensor, an external weather sensor and an illuminance sensor. The seating sensor is configured to detect whether a driver is seated in a driver seat. The face orientation sensor is configured to detect a direction of a face of the driver. The external weather sensor is configured to detect external weather at a current position of the vehicle 1. The illuminance sensor is configured to detect a brightness (an illuminance) of the surrounding environment of the vehicle 1.

The camera 6 is, for example, a camera including an imaging element such as a charge-coupled device (CCD) or a complementary MOS (CMOS). The camera 6 includes one or more external cameras 6A and an internal camera 6B. The external camera 6A is configured to acquire image data indicating the surrounding environment of the vehicle 1 and then transmit the image data to the vehicle control unit 3. The vehicle control unit 3 acquires the surrounding environment information based on the transmitted image data. Here, the surrounding environment information may include information on the object (a pedestrian, other vehicles, a sign or the like) present outside the vehicle 1. For example, the surrounding environment information may include information on attributes of the object present outside the vehicle 1 and information on a distance or a position of the object with respect to the vehicle 1. The external camera 6A may be configured as a monocular camera or a stereo camera.

The image data acquired by the external camera 6A is transmitted to the display control unit 43. Based on the transmitted image data, the display control unit 43 displays the surrounding environment image indicating the surrounding environment of the vehicle 1 on the HUD 42 (specifically, the HUD display area) at a predetermined frame rate. When four external cameras 6A are mounted on the vehicle 1, each of the four external cameras 6A may be disposed at one of four corners of the vehicle 1. In this case, the display control unit 43 may generate the surrounding environment image by combining the image data transmitted from the external cameras 6A, and then display the generated surrounding environment image on the HUD 42.

The internal camera 6B is disposed inside the vehicle 1 and is configured to acquire image data indicating the occupant H. The internal camera 6B functions as a tracking camera for tracking the viewpoint E of the occupant H. Here, the viewpoint E of the occupant H may be either a viewpoint of a left eye or a viewpoint of a right eye of the occupant H. Alternatively, the viewpoint E may be defined as a middle point of a line segment connecting the viewpoint of the left eye and the viewpoint of the right eye. The display control unit 43 may specify a position of the viewpoint E of the occupant H based on the image data acquired by the internal camera 6B. The position of the viewpoint E of the occupant H may be updated at a predetermined cycle based on the image data, or may be determined only once when the vehicle 1 is started.

The radar 7 includes at least one of a millimeter wave radar, a microwave radar and a laser radar (for example, a LiDAR unit). For example, the LiDAR unit is configured to detect the surrounding environment of the vehicle 1. In particular, the LiDAR unit is configured to acquire 3D mapping data (point cloud data) indicating the surrounding environment of the vehicle 1 and then transmit the 3D mapping data to the vehicle control unit 3. The vehicle control unit 3 specifies the surrounding environment information based on the transmitted 3D mapping data.

The HMI 8 includes an input unit that receives an input operation from the driver, and an output unit that outputs the traveling information or the like to the driver. The input unit includes a steering wheel, an accelerator pedal, a brake pedal, a driving mode switching switch that switches a driving mode of the vehicle 1, and the like. The output unit is a display (excluding a HUD) that displays various types of travel information. The GPS 9 is configured to acquire current position information of the vehicle 1 and output the acquired current position information to the vehicle control unit 3.

The wireless communication unit 10 is configured to receive information on other vehicles around the vehicle 1 (for example, traveling information) from other vehicles and transmit information (for example, the traveling information) on the vehicle 1 to other vehicles (inter-vehicle communication). The wireless communication unit 10 is configured to receive infrastructure information from infrastructure equipment such as a traffic light or a sign lamp and transmit the traveling information on the vehicle 1 to the infrastructure equipment (road-vehicle communication). The wireless communication unit 10 is configured to receive information on a pedestrian from a portable electronic device (a smart phone, a tablet, a wearable device or the like) carried by the pedestrian and transmit the own vehicle traveling information on the vehicle 1 to the portable electronic device (pedestrian-vehicle communication). The vehicle 1 may directly communicate with other vehicles, the infrastructure equipment or the portable electronic device in an ad-hoc mode, or via an access point. The vehicle 1 may communicate with other vehicles, the infrastructure equipment or the portable electronic device via a communication network (not shown). The communication network includes at least one of the Internet, a local area network (LAN), a wide area network (WAN) and a radio access network (RAN). A wireless communication standard is, for example, Wi-Fi (registered trademark), Bluetooth (registered trademark), ZigBee (registered trademark), IPWA, DSRC (registered trademark) or Li-Fi. The vehicle 1 may communicate with other vehicles, the infrastructure equipment or the portable electronic device using a fifth generation mobile communication system (5G).

The storage device 11 is an external storage device such as a hard disk drive (HDD) or a solid state drive (SSD). The storage device 11 may store two-dimensional or three-dimensional map information and/or a vehicle control program. For example, the three-dimensional map information may include 3D mapping data (point cloud data). The storage device 11 is configured to output the map information and the vehicle control program to the vehicle control unit 3 in response to a request from the vehicle control unit 3. The map information and the vehicle control program may be updated via the wireless communication unit 10 and the communication network.

When the vehicle 1 travels in the automated driving mode, the vehicle control unit 3 automatically generates at least one of a steering control signal, an accelerator control signal and a brake control signal based on the traveling state information, the surrounding environment information, the current position information, the map information and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, the vehicle control unit 3 automatically controls the traveling of the vehicle 1 based on the traveling state information, the surrounding environment information, the current position information, the map information and the like. That is, in the automated driving mode, the traveling of the vehicle 1 is automatically controlled by the vehicle system 2.

On the other hand, when the vehicle 1 travels in a manual driving mode, the vehicle control unit 3 generates the steering control signal, the accelerator control signal and the brake control signal according to a manual operation of the driver on the accelerator pedal, the brake pedal and the steering wheel. In this way, in the manual driving mode, since the steering control signal, the accelerator control signal and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes a fully automated driving mode, an advanced driving support mode and a driving support mode. In the fully automated driving mode, the vehicle system 2 automatically performs all traveling controls including the steering control, the brake control and the accelerator control, and the driver cannot drive the vehicle 1. In the advanced driving support mode, the vehicle system 2 automatically performs all the traveling controls including the steering control, the brake control and the accelerator control, and the driver can drive the vehicle 1 but does not drive the vehicle 1. In the driving support mode, the vehicle system 2 automatically performs a part of the traveling controls including the steering control, the brake control and the accelerator control, and the driver drives the vehicle 1 under driving support of the vehicle system 2. In contrast, in the manual driving mode, the vehicle system 2 does not automatically perform the traveling controls, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among four driving modes (the fully automated driving mode, the advanced driving support mode, the driving support mode and the manual driving mode) according to an operation of the driver on the driving mode switching switch. The driving mode of the vehicle 1 may be automatically switched based on information on a travelable section where the automated driving vehicle can travel or a traveling-prohibited section where traveling of the automated driving vehicle is prohibited, or information on the external weather condition. In this case, the vehicle control unit 3 switches the driving mode of the vehicle 1 based on these pieces of information. The driving mode of the vehicle 1 may be automatically switched by using the seating sensor, the face orientation sensor or the like. In this case, the vehicle control unit 3 switches the driving mode of the vehicle 1 based on a signal output from the seating sensor or the face orientation sensor.

Figure 4:
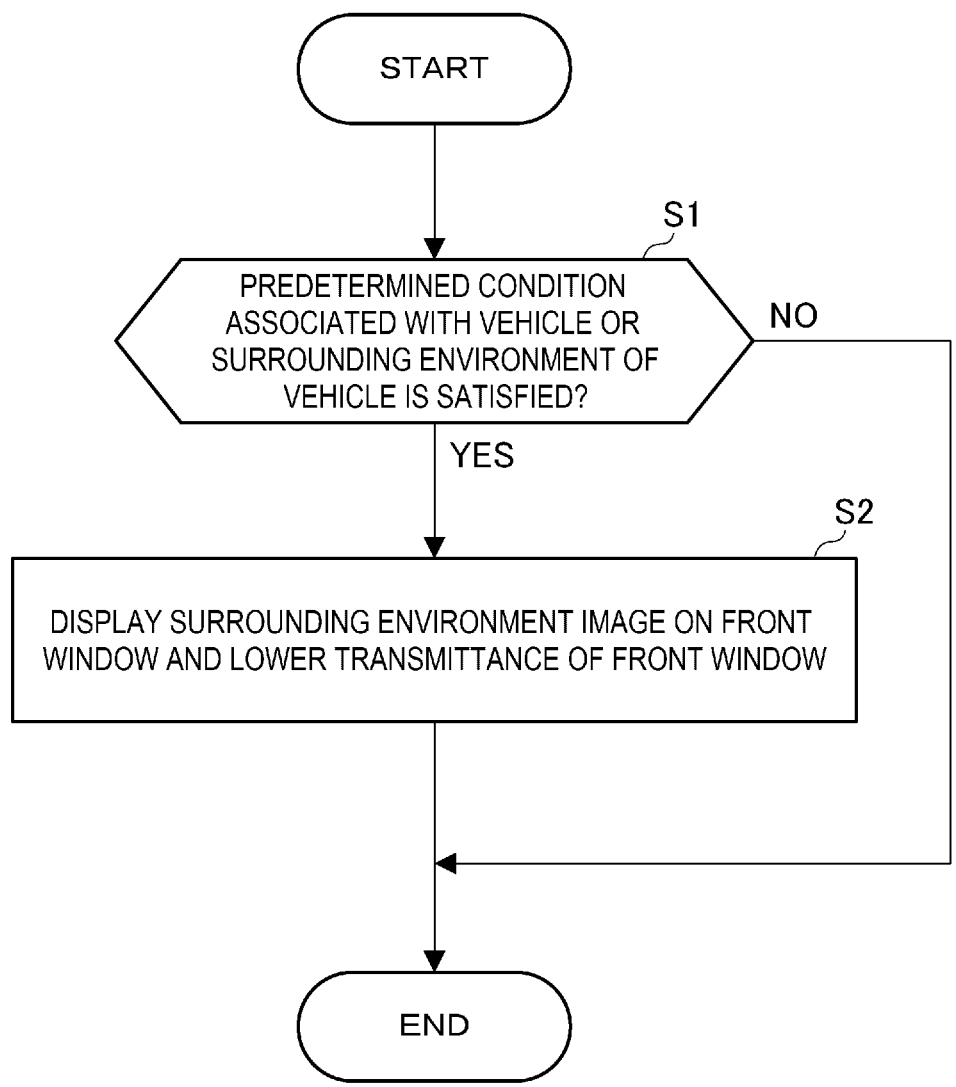
FIG. 4 is a flowchart for explaining an example of an operation of a vehicle display system according to the first embodiment.
Figure 5:
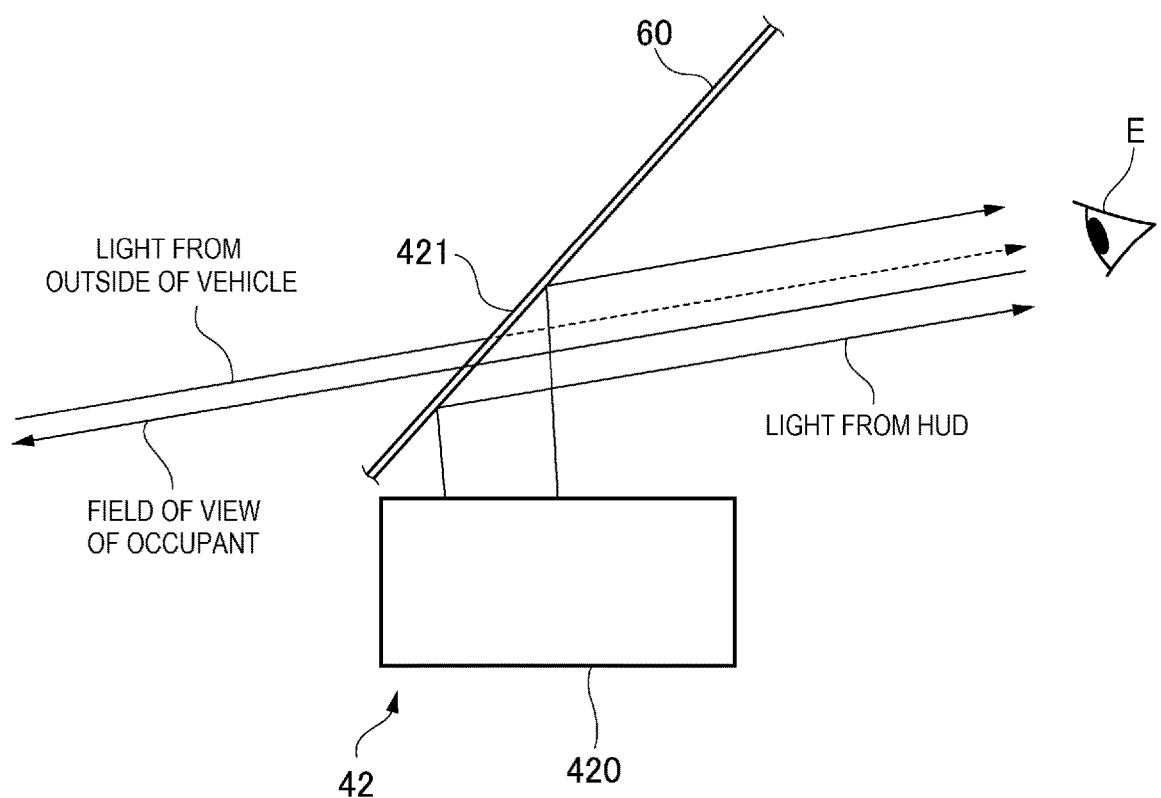
FIG. 5 is a view showing a state in which light from outside of the vehicle is blocked by a front window.
Figure 6:
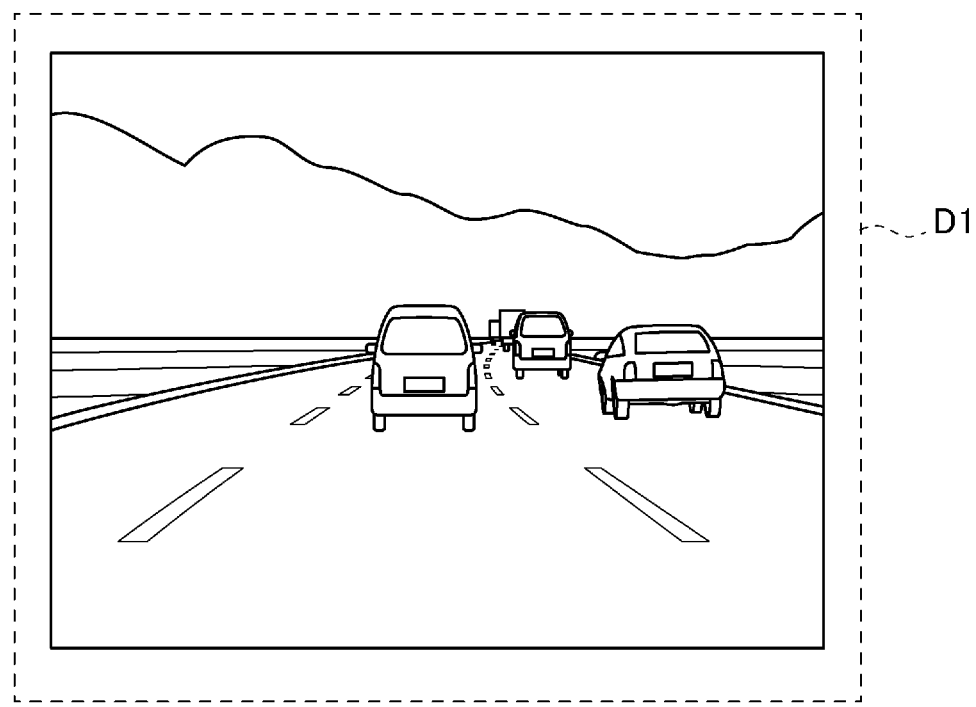
FIG. 6 is a view showing an example of a surrounding environment image displayed in a HUD display area.

Next, an example of an operation of the display system 4 according to the present embodiment will be described below with reference to FIGS. 4 to 7. FIG. 4 is a flowchart for explaining an example of the operation of the display system 4. FIG. 5 is a view showing a state in which light from outside of the vehicle 1 is blocked by the front window 60. FIG. 6 is a view showing an example of the surrounding environment image displayed in the HUD display area D1. FIG. 7 is a table showing a specific example of a "predetermined condition" shown in the flowchart in FIG. 4.

As shown in FIG. 4, in step S1, the display control unit 43 determines whether a predetermined condition associated with the vehicle 1 or the surrounding environment of the vehicle 1 is satisfied. When a determination result of step S1 is YES, the display control unit 43 displays the surrounding environment image indicating the surrounding environment of the vehicle 1 on the front window 60 (specifically, the HUD display area D1) and lowers a transmittance of the front window 60 (step S2). On the other hand, if the determination result of step S1 is NO, the processing ends.

As shown in FIG. 7, specific examples of the "predetermined condition" in step S1 include the following six conditions.

1) When the light pattern is emitted onto the road surface
2) When the driving mode of the vehicle 1 is the advanced driving support mode or the fully automated driving mode
3) When the brightness of the surrounding environment of the vehicle 1 is equal to or smaller than a first brightness
4) When the brightness of the surrounding environment of the vehicle 1 is equal to or larger than a second brightness
5) When the road on which the vehicle 1 is currently traveling is an automated driving vehicle dedicated road
6) When the weather at the current position of the vehicle 1 is bad weather 1) When the Light Pattern is Emitted onto the Road Surface When determining that the road surface drawing device 45 has emitted the light pattern toward the road surface (YES in step S1), the display control unit 43 displays the surrounding environment image on the front window 60 and lowers the transmittance of the front window 60 (step S2). In this respect, the display control unit 43 controls the operation of the road surface drawing device 45. Therefore, when the road surface drawing device 45 is driven, the display control unit 43 may display the surrounding environment image on the front window 60 and lowers the transmittance of the front window 60.

2) When the Driving Mode of the Vehicle 1 is the Advanced Driving Support Mode or the Fully Automated Driving Mode When determining that the driving mode of the vehicle 1 is the advanced driving support mode or the fully automated driving mode after receiving the information indicating the driving mode of the vehicle 1 from the vehicle control unit 3 (YES in step S1), the display control unit 43 displays the surrounding environment image on the front window 60 and lowers the transmittance of the front window 60 (step S2).

3) When the Brightness of the Surrounding Environment of the Vehicle 1 is Equal to or Smaller than a First Brightness The vehicle control unit 3 acquires illuminance data indicating the illuminance of the surrounding environment of the vehicle 1 from the illuminance sensor, and then transmits the illuminance data to the display control unit 43.

Next, when determining that the illuminance of the surrounding environment of the vehicle 1 is equal to or smaller than a first illuminance based on the illuminance data (YES in step S1), the display control unit 43 displays the surrounding environment image on the front window 60 and lowers the transmittance of the front window 60 (step S2). For example, when the vehicle 1 is traveling at night or when the vehicle 1 is traveling in a tunnel, the determination result of step S1 is YES. Although the illuminance of the surrounding environment is mentioned as an example of the brightness of the surrounding environment, the brightness is not limited to the illuminance.

4) When the Brightness of the Surrounding Environment of the Vehicle 1 is Equal to or Larger than a Second Brightness When determining that the illuminance of the surrounding environment of the vehicle 1 is equal to or larger than a second illuminance based on the illuminance data acquired from the illuminance sensor (YES in step S1), the display control unit 43 displays the surrounding environment image on the front window 60 and lowers the transmittance of the front window 60 (step S2). For example, when the vehicle 1 is illuminated by fairly bright light (such as sunlight or illumination light that illuminates a construction work), the determination result of step S1 is YES.

5) When the Road on which the Vehicle 1 is Currently Traveling is an Automated Driving Vehicle Dedicated Road The vehicle control unit 3 acquires the current position information indicating the current position of the vehicle 1 from the GPS 9 and acquires the map information from the storage device 11. Next, the vehicle control unit 3 transmits the current position information and the map information to the display control unit 43. Next, the display control unit 43 specifies the road on which the vehicle 1 is currently traveling based on the current position information and the map information. Next, when determining that the road on which the vehicle 1 is currently traveling is the automated driving vehicle dedicated road (YES in step S1), the display control unit 43 displays the surrounding environment image on the front window 60 and lowers the transmittance of the front window 60 (step S2).

6) When the Weather at the Current Position of the Vehicle 1 is Bad Weather

The vehicle control unit 3 generates weather information indicating the weather at the current position of the vehicle 1 based on the image data acquired from the external camera 6A, and then transmits the weather information to the display control unit 43. Next, when determining that the weather at the current position of the vehicle 1 is the bad weather (that is, rainy, snowy or the like) based on the received weather information (YES in step S1), the display control unit 43 displays the surrounding environment image on the front window 60 and lowers the transmittance of the front window 60 (step S2). The display control unit 43 may determine whether the weather at the current position of the vehicle 1 is the bad weather based on information indicating whether a wiper is being driven. In this respect, when the wiper is being driven, the display control unit 43 may determine that the weather at the current position of the vehicle 1 is the bad weather. The display control unit 43 may determine whether the weather at the current position of the vehicle 1 is the bad weather based on the weather information acquired from the external weather sensor or the weather information acquired from a server on the communication network.

According to the present embodiment, the occupant H can view the surrounding environment of the vehicle 1 through the surrounding environment image instead of a field of view visible to the occupant H through the front window 60 of the vehicle 1 (hereinafter, referred to as a direct field of view), depending on the predetermined condition associated with the vehicle 1 or the surrounding environment of the vehicle 1. In this way, a decrease in visibility of the surrounding environment of the vehicle 1 to the occupant H can be prevented.

The front window 60 may include a glass plate and a liquid crystal shutter disposed on the glass plate. The liquid crystal shutter functions as a transmittance adjusting unit capable of adjusting the transmittance of light passing through the liquid crystal shutter. The liquid crystal shutter includes, for example, two polarizing filters and a liquid crystal layer provided between the two polarizing filters. One of the two polarizing filters may be configured to allow the light polarized in a predetermined direction to pass therethrough, while the other of the two polarizing filters may be configured to allow the light polarized in a direction perpendicular to the predetermined direction to pass therethrough. When a voltage is applied to the liquid crystal layer, an alignment direction of liquid crystal molecules in the liquid crystal layer changes, so that the transmittance of the light passing through the liquid crystal shutter can be adjusted. In particular, the display control unit 43 can lower the transmittance of the liquid crystal shutter (that is, the front window 60) by adjusting the voltage applied to the liquid crystal layer. For example, the transmittance of the liquid crystal shutter can be set to 10% or lower. In this way, as shown in FIG. 5, the occupant can be prevented from viewing the light from the outside of the vehicle 1 by lowering the transmittance of the front window 60. On the other hand, it should be noted that in this state, the occupant H can clearly view the surrounding environment image output from the HUD main body 420.

When the weather at the current position of the vehicle 1 is rainy or snowy, the surrounding environment image displayed in the HUD display area D1 may be an image from which raindrops and snow have been removed. In this case, the display control unit 43 may execute predetermined image processing for removing the raindrops and the like displayed in still image data (frame). In this way, since the raindrops and the like are removed from the surrounding environment image, the visibility of the surrounding environment to the occupant H can be improved as compared with the direct field of view.

The HUD 42 is configured to display the surrounding environment image of a traveling direction of the vehicle 1 on the front window 60. For example, when the vehicle 1 moves forward, the surrounding environment image ahead of the vehicle 1 is displayed on the front window 60. In this case, the display control unit 43 displays the surrounding environment image on the HUD 42 based on the image data indicating the surrounding environment ahead of the vehicle 1. On the other hand, when the vehicle 1 moves backward, the surrounding environment image behind the vehicle 1 is displayed on the front window 60. In this case, the display control unit 43 displays the surrounding environment image on the HUD 42 based on the image data indicating the surrounding environment behind the vehicle 1.

In this way, when the vehicle 1 is moving backward, since the surrounding environment image behind the vehicle 1 is displayed on the front window 60, the decrease in visibility of the surrounding environment of the vehicle 1 to the occupant H can be prevented.

Figure 8:
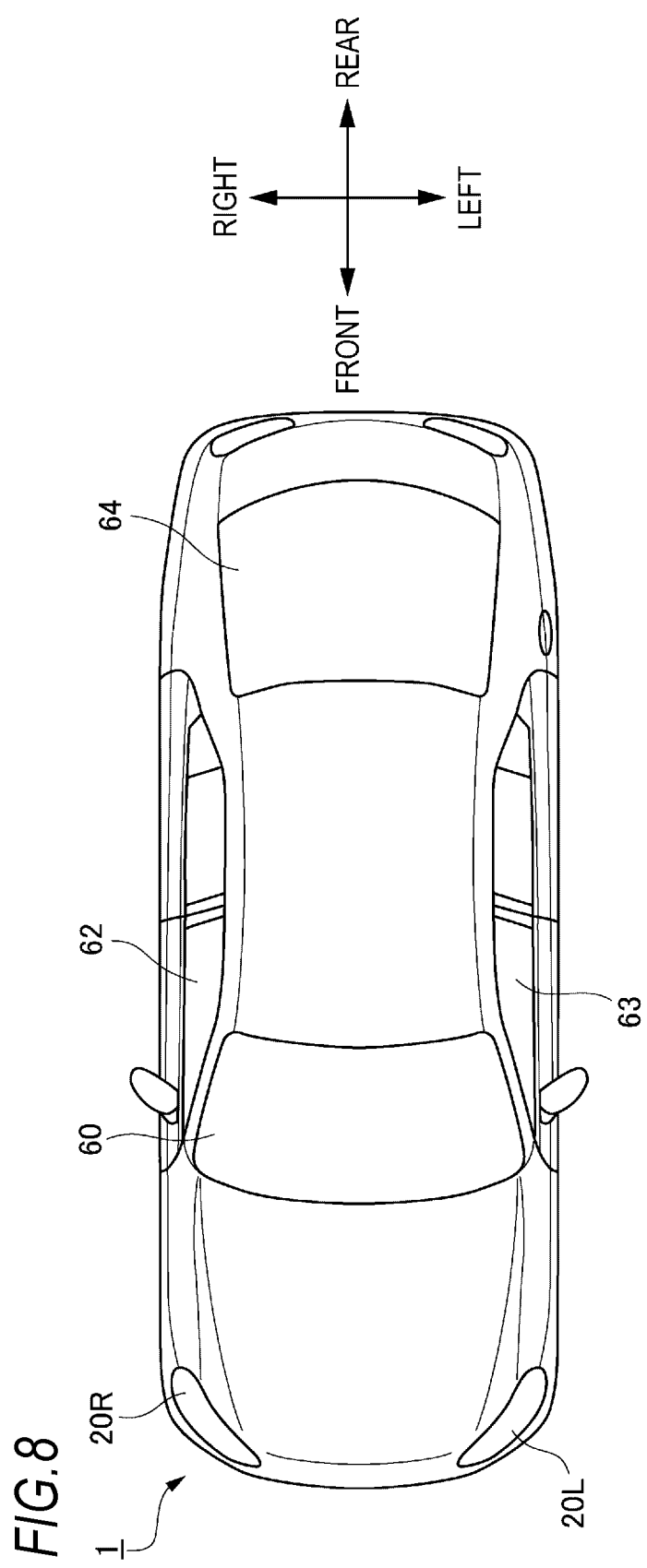
FIG. 8 is a top view of the vehicle.

In addition, the surrounding environment image may be displayed on all windows of the vehicle 1. In this respect, the surrounding environment image may be displayed on each of the front window 60, the left side window 63, the right side window 62 and the rear window 64 (see FIG. 8). In this case, the vehicle 1 may include the HUD 42 that displays the surrounding environment image indicating the surrounding environment ahead of the vehicle 1 on the front window 60, a second HUD (not shown) that displays the surrounding environment image indicating the surrounding environment on a left side of vehicle 1 in the left side window 63, a third HUD (not shown) that displays the surrounding environment image indicating the surrounding environment on a right side of vehicle 1 in the right side window 62, and the fourth HUD (not shown) that displays the surrounding environment image indicating the surrounding environment behind the vehicle 1 on the rear window 64. Each of the front window 60, the left side window 63, the right side window 62 and the rear window 64 may include a liquid crystal shutter. When the surrounding environment image is displayed on each of the front window 60, the left side window 63, the right side window 62 and the rear window 64, the display control unit 43 lowers the transmittance of each of the front window 60, the left side window 63, the right side window 62 and the rear window 64. In this way, the occupant H can clearly view the surrounding environment of the vehicle 1 through the surrounding environment images displayed on all the windows, and the decrease in visibility of the surrounding environment of the vehicle 1 to the occupant H can be prevented.

In the present embodiment, depending on the predetermined condition associated with the vehicle 1 or the surrounding environment of the vehicle 1, the display control unit 43 displays the surrounding environment image on the front window 60 and lowers the transmittance of the front window 60. However, the present embodiment is not limited thereto. For example, the display control unit 43 may display the surrounding environment image on the front window 60 and lowers the transmittance of the front window 60 according to a manual operation of the occupant H (for example, a predetermined input operation on the HUD 42).

In step S2 in FIG. 4, not only the surrounding environment image but also an image content such as a movie or an advertisement image may be displayed on the front window 60. Further, the surrounding environment image may be displayed on the front window 60, and the image content may be displayed in a window other than the front window 60.

Second Embodiment

Hereinafter, a second embodiment of the present invention (hereinafter, referred to as the second embodiment) will be described with reference to the drawings. Dimensions of members shown in the drawings may be different from actual dimensions of the members for convenience of description. Hereinafter, components denoted by the same reference numerals as those described in the first embodiment will not be specifically described.

Figure 9:
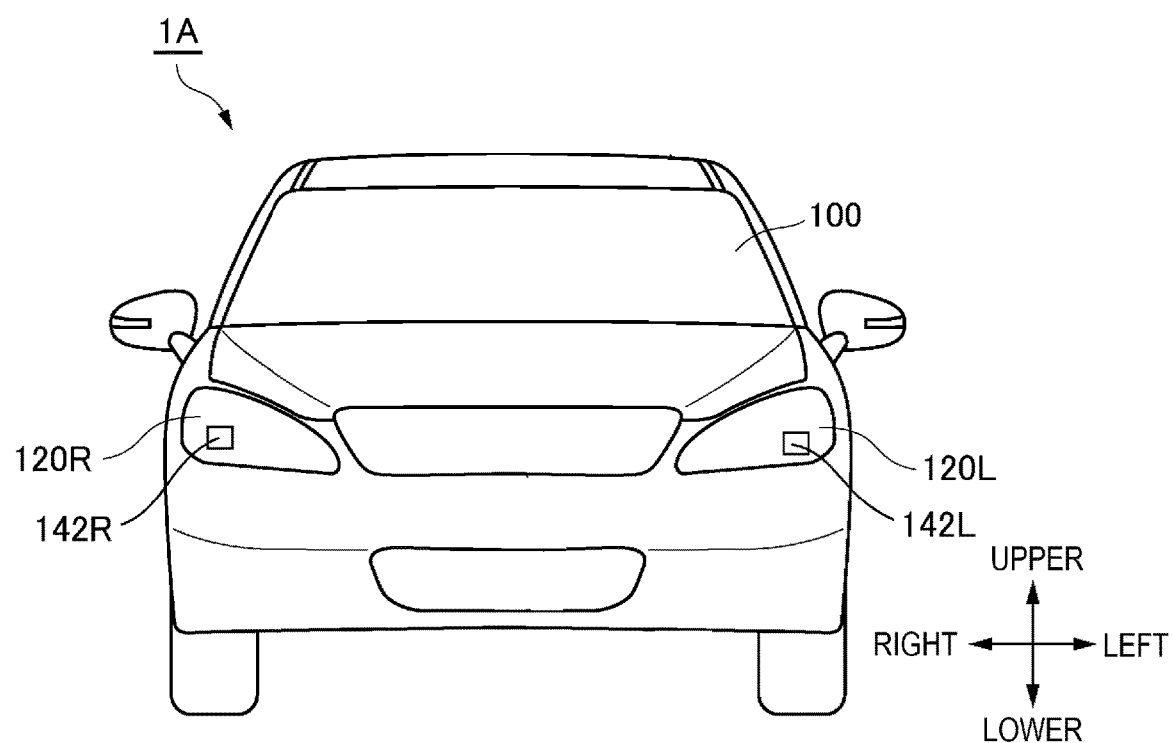
FIG. 9 is a front view of a vehicle equipped with a vehicle system.
Figure 10:
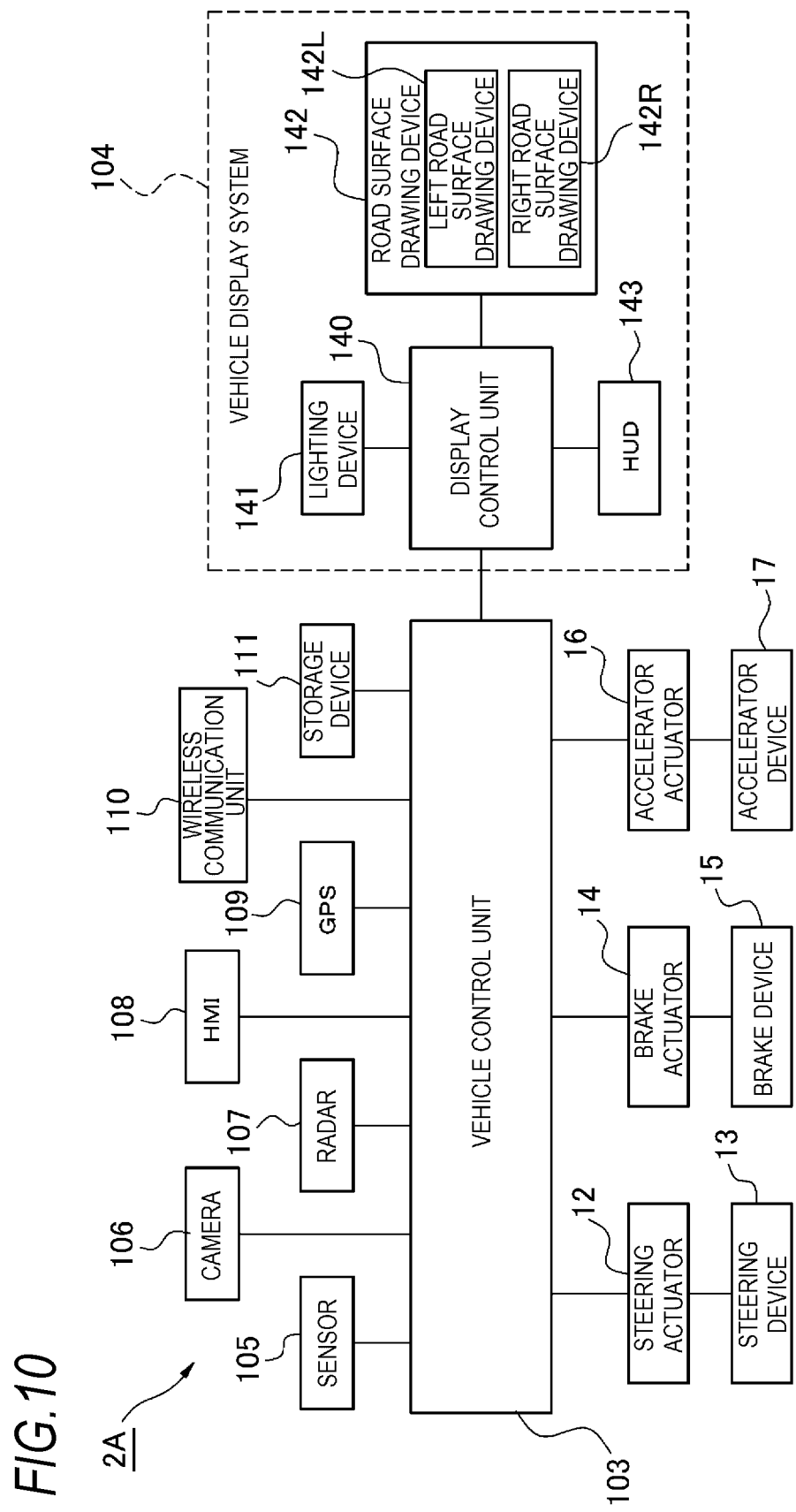
FIG. 10 is a block diagram of the vehicle system.

First, a vehicle system 2A according to the present embodiment will be described below with reference to FIGS. 9 and 10. FIG. 9 is a front view of a vehicle 1A quipped with the vehicle system 2A. FIG. 10 is a block diagram of the vehicle system 2A. The vehicle 1A is a vehicle (an automobile) capable of traveling in an automated driving mode.

As shown in FIG. 10, the vehicle system 2A includes a vehicle control unit 103, a vehicle display system 104 (hereinafter, simply referred to as a "display system 104"), a sensor 105, a camera 106 and a radar 107. The vehicle system 2A further includes a human machine interface (HMI) 108, a global positioning system (GPS) 109, a wireless communication unit 110 and a storage device 111. The vehicle system 2A further includes the steering actuator 12, the steering device 13, the brake actuator 14, the brake device 15, the accelerator actuator 16 and the accelerator device 17.

The vehicle control unit 103 is configured to control traveling of the vehicle 1A. The vehicle control unit 103, for example, includes at least one electronic control unit (ECU). The electronic control unit includes a computer system (for example, a system on a chip (SoC)) including one or more processors and one or more memories, and an electronic circuit including an active element such as a transistor and a passive element. The processor is, for example, a central processing unit (CPU), a micro processing unit (MPU), a graphics processing unit (GPU) and/or a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program constructed by supervised or unsupervised machine learning (particularly, deep learning) using a multilayer neural network. The RAM may temporarily store a vehicle control program, vehicle control data and/or surrounding environment information indicating a surrounding environment of the vehicle. The processor may be configured to load a program designated from various vehicle control programs stored in the ROM onto the RAM and to execute various types of processing in cooperation with the RAM. The computer system may include a non-Neumann type computer such as an application specific integrated circuit (ASIC) or a field-programmable gate array (FPGA). Further, the computer system may include a combination of a Neumann type computer and a non-Neumann type computer.

The display system 104 includes a display control unit 140, a lighting device 141, a road surface drawing device 142 and a head-up display (HUD) 143. The road surface drawing device 142 is an example of a first display device. The HUD 143 is an example of a second display device.

The lighting device 141 is configured to emit light toward outside of the vehicle 1A. The lighting device 141 includes a left headlamp 120L and a right headlamp 120R. The lighting device 141 may include, in addition to the headlamps 120L, 120R, a position lamp provided at a front portion of the vehicle 1A, rear combination lamps provided at a rear portion of the vehicle 1A, turn signal lamps provided at the front portion or side portions of the vehicle, various lamps that inform pedestrians and drivers of other vehicles of a situation of the own vehicle.

The road surface drawing device 142 is configured to emit a light pattern indicating predetermined information toward a road surface outside the vehicle 1A. The road surface drawing device 142 includes two road surface drawing devices (a left road surface drawing device 142L and a right road surface drawing device 142R). As shown in FIG. 9, the left road surface drawing device 142L is mounted in the left headlamp 120L, and the right road surface drawing device 142R is mounted in the right headlamp 120R. In the following description, the left road surface drawing device 142L and the right road surface drawing device 142R may be simply referred to as the road surface drawing device 142.

The road surface drawing device 142 includes, for example, a laser light source configured to emit laser light, a light deflection device configured to deflect the laser light emitted from the laser light source, and an optical system member such as a lens. The laser light source is, for example, RGB laser light sources configured to respectively emit red laser light, green laser light and blue laser light. The light deflection device is, for example, a micro electro mechanical systems (MEMS) mirror, a galvanometer mirror, a polygon mirror or the like. The road surface drawing device 142 is configured to draw light patterns M0, M1 (see FIG. 12A) on the road surface by scanning with the laser light. When the laser light source is the RGB laser light sources, the road surface drawing device 142 can draw light patterns of various colors on the road surface. The left road surface drawing device 142L and the right road surface drawing device 142R may draw different light patterns on the road surface, or may draw one light pattern on the road surface by synthesizing respective light patterns.

Although the road surface drawing device 142 includes the road surface drawing devices 142L, 142R mounted in the head lamps 120L, 120R in the present embodiment, the number, arrangement positions and shapes of the road surface drawing devices 142 are not particularly limited as long as the road surface drawing device 142 can draw the light pattern on the road surface. For example, the left road surface drawing device 142L and the right road surface drawing device 142R may be disposed in vicinity of the headlamps. When the number of the road surface drawing devices 142 is one, the road surface drawing device 142 may be disposed on a vehicle body roof. When the number of the road surface drawing devices 142 is four, one road surface drawing device 142 may be mounted in each of the left headlamp 120L, the right headlamp 120R, the left rear combination lamp (not shown), and the right rear combination lamp (not shown).

A drawing method of the road surface drawing device 142 may be a digital light processing (DLP) method or a liquid crystal on silicon (LCOS) method. In this case, an LED is used as a light source instead of laser.

Figure 12A:
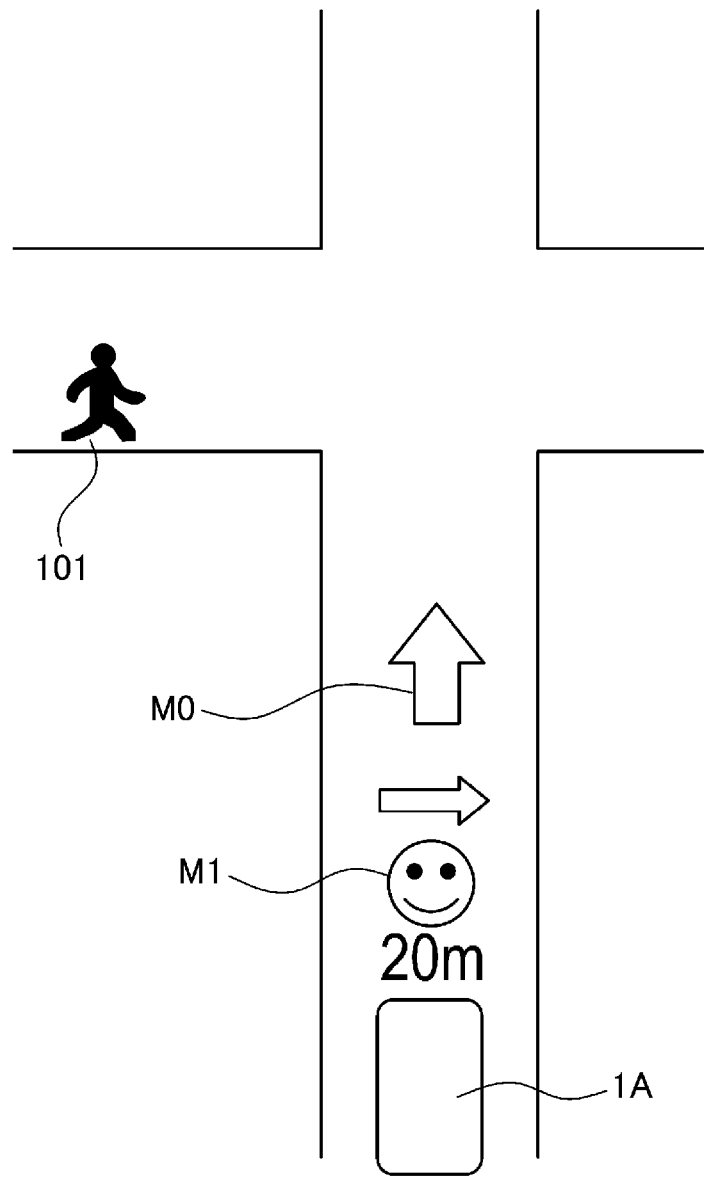
FIG. 12A is a view for explaining an example of road surface drawing before display switching according to the second embodiment.
Figure 12B:
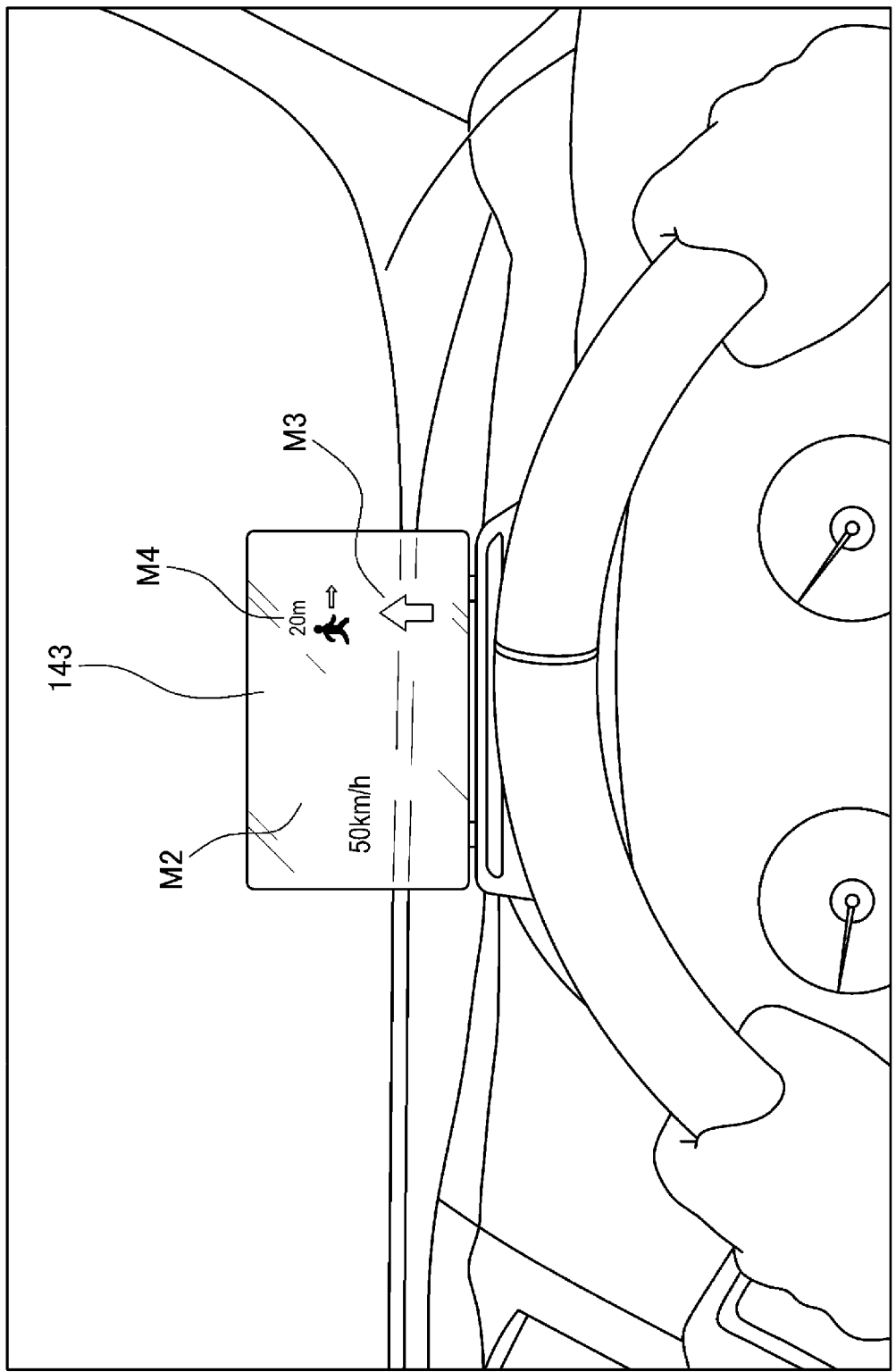
FIG. 12B is a view for explaining an example of a HUD after the display switching according to the second embodiment.

The HUD 143 is configured to display vehicle traveling information on the traveling of the vehicle 1A toward an occupant of the vehicle 1A such that the vehicle traveling information is superimposed on a real space outside the vehicle 1A. The HUD 143 is installed at a predetermined position inside the vehicle 1A. For example, as shown in FIG. 12B, the HUD 143 is installed on a dashboard of the vehicle 1A. The position where the HUD 143 is installed is not particularly limited. The HUD 143 functions as a visual interface between the vehicle 1A and the occupant. In particular, the HUD 143 is configured to visually present the vehicle traveling information to the occupant. The vehicle traveling information includes information on driving of the vehicle 1A (for example, information on automated driving), the pedestrian information and the like. For example, the HUD 143 is configured to display information obtained by inter-vehicle communication between the vehicle 1A and other vehicles and/or road-vehicle communication between vehicle 1A and infrastructure equipment (a traffic light or the like). In this respect, the HUD 143 is configured to display messages transmitted from other vehicles and/or the infrastructure equipment. The occupant of the vehicle 1A can grasp intentions of other vehicles by looking at the message displayed by the HUD 143. For example, the HUD 143 is configured to display information obtained from the sensor 105 and/or the camera 106. The occupant of the vehicle 1A can grasp a traveling state of the vehicle 1A and/or pedestrian information by looking at a message displayed by the HUD 143. The information displayed by the HUD 143 is visually presented to the occupant of the vehicle 1A so as to be superimposed on the real space ahead of the vehicle 1A. In this way, the HUD 143 functions as an augmented reality (AR) display.

The HUD 143 includes an image generation unit and a transparent screen on which an image generated by the image generation unit is displayed. When a drawing method of the HUD 143 is a laser projector method, the image generation unit includes, for example, a laser light source configured to emit laser light, a light deflection device configured to deflect the laser light emitted from the laser light source, and an optical system member such as a lens. The laser light source is, for example, RGB laser light sources configured to respectively emit red laser light, green laser light and blue laser light. The light deflection device is, for example, a MEMS mirror. The drawing method of the HUD 143 may be a digital light processing (DLP) method or a liquid crystal on silicon (LCOS) method. In this case, an LED is used as a light source instead of laser.

The HUD 143 may not include the transparent screen. In this case, the image generated by the image generation unit may be displayed on a windshield 100 of the vehicle 1A.

The display control unit 140 is configured to control driving of the lighting device 141. For example, the display control unit 140 controls the lighting device 141 to emit predetermined light based on information on the vehicle 1A or information on a surrounding environment of the vehicle 1A. The display control unit 140 is configured to control driving of the road surface drawing device 142 and the HUD 143. For example, the display control unit 140 controls the road surface drawing device 142 such that a predetermined light pattern is presented toward other vehicles or a pedestrian based on the information on the vehicle 1A or the information on the surrounding environment of the vehicle 1A. The display control unit 140 controls the HUD 143 such that predetermined vehicle traveling information is presented toward the occupant based on the information on the vehicle 1A or the information on the surrounding environment of the vehicle 1A.

The display control unit 140 includes an electronic control unit (ECU), and is electrically connected to a power supply (not shown). The electronic control unit includes a computer system (for example, an SoC) including one or more processors and one or more memories, and an analog processing circuit including an active element such as a transistor and a passive element. The analog processing circuit includes a lamp drive circuit (for example, an LED driver) configured to control driving of a lamp of the lighting device 141. The analog processing circuit includes a first laser light source control circuit configured to control driving of the laser light source of the road surface drawing device 142, and a first light deflection device control circuit configured to control driving of the light deflection device of the road surface drawing device 142. The analog processing circuit also includes a second laser light source control circuit configured to control driving of the laser light source of the HUD 143, and a second light deflection device control circuit configured to control driving of the light deflection device of the HUD 143. The processor is, for example, a CPU, an MPU, a GPU and/or a TPU. The memory includes a ROM and a RAM. The computer system may include a non-Neumann type computer such as an ASIC or an FPGA.

In the present embodiment, the common display control unit 140 is provided for the lighting device 141, the road surface drawing device 142 and the HUD 143, but a separate display control unit may be provided for each of them. In the present embodiment, the vehicle control unit 103 and the display control unit 140 are provided as separate components, but the vehicle control unit 103 and the display control unit 140 may be integrally configured. In this respect, the display control unit 140 and the vehicle control unit 103 may be formed of a single electronic control unit. In this case, the vehicle display system 104 also includes the vehicle control unit 103.

For example, the computer system of the display control unit 140 specifies a light pattern to be radiated to the outside of the vehicle 1A based on an instruction signal transmitted from the vehicle control unit 103, and then transmits a signal indicating the specified light pattern to the first laser light source control circuit and the first light deflection device control circuit. The first laser light source control circuit generates a control signal for controlling the driving of the laser light source based on the signal indicating the light pattern, and then transmits the generated control signal to the laser light source of the road surface drawing device 142. On the other hand, the first light deflection device control circuit generates a control signal for controlling the driving of the light deflection device based on the signal indicating the light pattern, and then transmits the generated control signal to the light deflection device of the road surface drawing device 142. In this way, the display control unit 140 can control the driving of the road surface drawing device 142.

The computer system of the display control unit 140 specifies image information (for example, information of characters and figures) displayed on the HUD 143 based on an instruction signal transmitted from the vehicle control unit 103, and then transmits a signal indicating the specified image information to the second laser light source control circuit and the second light deflection device control circuit. The second laser light source control circuit generates a control signal for controlling the driving of the laser light source based on the signal indicating the image information, and transmits the generated control signal to the laser light source of the HUD 143. On the other hand, the second light deflection device control circuit generates a control signal for controlling the driving of the light deflection device based on the signal indicating the image information, and then transmits the generated control signal to the light deflection device of the HUD 143. In this way, the display control unit 140 can control the driving of the HUD 143.

The sensor 105 includes an acceleration sensor, a speed sensor, a gyro sensor or the like. The sensor 105 is configured to detect the traveling state of the vehicle 1A and output traveling state information to the vehicle control unit 103. The sensor 105 may further include a seating sensor that detects whether a driver is seated in a driver seat, a face orientation sensor that detects a direction of a face of the driver, an external weather sensor that detects an external weather condition, a human sensor that detects whether there is a person in the vehicle, or the like. The sensor 105 may include a sensor that acquires the surrounding environment information such as an illuminance sensor.

The camera 106 is, for example, a camera including an imaging element such as a charge-coupled device (CCD) or a complementary MOS (CMOS). The camera 106 is configured to acquire image data indicating the surrounding environment of the vehicle 1A and then transmit the image data to the vehicle control unit 103. The vehicle control unit 103 acquires the surrounding environment information based on the transmitted image data. Here, the surrounding environment information may include information on an object (a pedestrian, other vehicles, a sign or the like)

present outside the vehicle 1A. For example, the surrounding environment information may include information on attributes of the object present outside the vehicle 1A and information on a distance or a position of the object with respect to the vehicle 1A. The camera 106 may be configured as a monocular camera or a stereo camera.

The radar 107 is a millimeter wave radar, a microwave radar and/or a laser radar (for example, a LiDAR unit) or the like. For example, the LiDAR unit is configured to detect the surrounding environment of the vehicle 1A. In particular, the LiDAR unit is configured to acquire 3D mapping data (point cloud data) indicating the surrounding environment of the vehicle 1A and then transmit the 3D mapping data to the vehicle control unit 103. The vehicle control unit 103 specifies the surrounding environment information based on the transmitted 3D mapping data.

The HMI 108 includes an input unit that receives an input operation from the driver, and an output unit that outputs the traveling information or the like to the driver. The input unit includes a steering wheel, an accelerator pedal, a brake pedal, a driving mode switching switch that switches a driving mode of the vehicle 1A, and the like. The GPS 109 is configured to acquire current position information of the vehicle 1A and output the acquired current position information to the vehicle control unit 103. The current position information includes GPS coordinates (latitude and longitude) of the vehicle 1A.

The wireless communication unit 110 is configured to receive information on other vehicles around the vehicle 1A (for example, traveling information) from other vehicles and transmit information (for example, the traveling information) on the vehicle 1A to other vehicles (inter-vehicle communication). The wireless communication unit 110 is configured to receive infrastructure information from the infrastructure equipment such as a traffic light or a sign lamp and transmit the traveling information on the vehicle 1A to the infrastructure equipment (road-vehicle communication). The wireless communication unit 110 is configured to receive information on a pedestrian from a portable electronic device (a smart phone, a tablet, a wearable device or the like) carried by the pedestrian and transmit the own vehicle traveling information on the vehicle 1A to the portable electronic device (pedestrian-vehicle communication). The vehicle 1A may directly communicate with other vehicles, the infrastructure equipment or the portable electronic device in an ad-hoc mode, or via an access point. The vehicle 1A may communicate with other vehicles, the infrastructure equipment or the portable electronic device via a communication network such as the Internet. A wireless communication standard is, for example, Wi-Fi (registered trademark), Bluetooth (registered trademark), ZigBee (registered trademark), IPWA, DSRC (registered trademark) or Li-Fi. The vehicle 1A may communicate with other vehicles, the infrastructure equipment or the portable electronic device using a fifth generation mobile communication system (5G).

The storage device 111 is an external storage device such as a hard disk drive (HDD) or a solid state drive (SSD). The storage device 111 may store 2D or 3D map information and/or a vehicle control program. For example, the 3D map information may include point cloud data. The storage device 111 is configured to output the map information and the vehicle control program to the vehicle control unit 103 in response to a request from the vehicle control unit 103. The map information and the vehicle control program may be updated via the wireless communication unit 110 and a communication network 200 such as the Internet.

The vehicle 1A can travel in the automated driving mode and a manual driving mode. The vehicle control unit 103 can selectively execute the automated driving mode and the manual driving mode.

In the automated driving mode, the vehicle control unit 103 automatically generates a steering control signal, an accelerator control signal and a brake control signal according to an output of an external sensor (at least one of the camera 106, the radar 107, the GPS 109, the wireless communication unit 110 and the like) that acquires information outside the vehicle 1A. The vehicle control unit 103 automatically generates the steering control signal, the accelerator control signal and the brake control signal according to the output of the external sensor, regardless of an output of the sensor 105 that detects displacement of an operator that can be operated by a user.

For example, in the automated driving mode, the vehicle control unit 103 automatically generates the steering control signal, the accelerator control signal and the brake control signal based on the surrounding environment information ahead of the vehicle 1A acquired by the camera 106, the current position information of the GPS 109, and the map information stored in the storage device 111. In the automated driving mode, the vehicle 1A is driven independently of the user.

In the manual driving mode, the vehicle control unit 103 normally generates the steering control signal, the accelerator control signal and the brake control signal regardless of the output of the external sensor. That is, in the manual driving mode, the vehicle control unit 103 normally generates the steering control signal based on an operation of the steering wheel by the user, regardless of the output of the external sensor. The vehicle control unit 103 normally generates the accelerator control signal based on an operation of the accelerator pedal by the user, regardless of the output of the external sensor. The vehicle control unit 103 generates the brake control signal based on an operation of the brake pedal by the user, regardless of the output of the external sensor. In the manual driving mode, the vehicle 1A is normally driven by the user.

In the manual driving mode, the vehicle control unit 103 may execute anti-lock brake control for controlling the brake control signal according to an output of a wheel speed sensor that is the sensor 105, for example. In the manual driving mode, the vehicle control unit 103 may execute sideslip prevention control (electric stability control), traction control and the like for control at least one of the steering control signal, the accelerator control signal and the brake control signal according to outputs of a steering angle sensor, a wheel speed sensor and a yaw rate sensor that are the sensor 105.

Alternatively, in the manual driving mode, the vehicle control unit 103 may execute pre-crash control or collision avoidance control for generating the steering control signal and the brake control signal according to the output of the external sensor such as the camera 106 in an emergency. In this way, in the manual driving mode, the vehicle control unit 103 may generate at least one of the steering control signal, the accelerator control signal and the brake control signal according to the output of the external sensor in an emergency.

In the manual driving mode, a trigger that generates the steering control signal, the accelerator control signal and the brake control signal is normally a displacement of an operator such as the steering wheel, the accelerator pedal and the brake pedal operated by the user. In the manual driving mode, the vehicle control unit 103 may normally control (process) a signal such as the steering control signal, the accelerator control signal and the brake control signal generated by the displacement of the operator according to the output of the sensor 105 or the external sensor. In the present embodiment, a so-called assist driving mode in which driving of the user is assisted according to the output of the sensor 105 or the external sensor is one form of the manual driving mode.

According to a definition of levels 0 to 5 of the automated driving mode currently known in 2018, the automated driving mode of the present embodiment corresponds to levels 3 to 5 (excluding an emergency or the like), and the manual driving mode of the present embodiment corresponds to levels 0 to 2.

The display control unit 140 is configured to control the road surface drawing device 142 and the HUD 143 such that information displayed by one of the road surface drawing device 142 and the HUD 143 is displayed by the other of the road surface drawing device 142 and the HUD 143 based on the information on the vehicle 1A or the information on the surrounding environment of the vehicle acquired from the vehicle control unit 103. The information on the vehicle 1A includes, for example, information on the driving mode of the vehicle (for example, driving mode switching information from the HMI 108, driving mode information based on the surrounding environment information, and the like). The information on the surrounding environment of the vehicle includes, for example, brightness information of the surrounding environment (for example, brightness information based on the image data of the camera 106, brightness information based on the weather information acquired from the external server, and brightness information based on detection data of the sensor 105), road information on a road on which the vehicle is currently traveling (for example, road information based on the map information and the current position information), weather information at a current position of the vehicle (for example, weather information based on a driving state of a wiper (not shown) mounted on vehicle 1A and the image data of the camera 106, and weather information acquired from the external server). The display control unit 140 may acquire these pieces of information directly from the sensor 105, the camera 106, the HIM 8, the GPS 109, the wireless communication unit 110, the storage device 111 and the like, instead of from the vehicle control unit 103.

Figure 11:
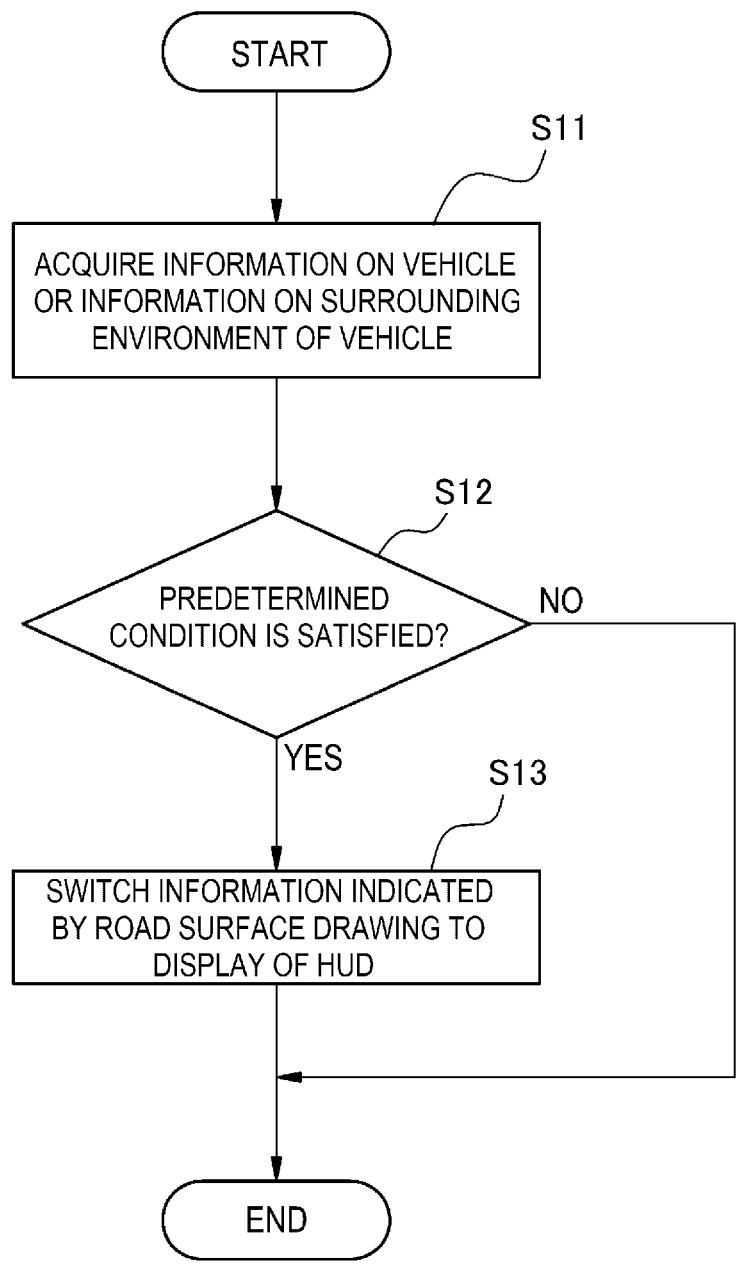
FIG. 11 is a flowchart for explaining an example of display switching control by a display control unit according to a second embodiment of the present invention.

Next, an example of display switching control of the display control unit 140 according to the second embodiment will be described with reference mainly to FIGS. 11 to 12B. FIG. 11 is a flowchart for explaining the example of the display switching control by the display control unit 140 according to the second embodiment. FIG. 12A is a view for explaining an example of road surface drawing before display switching according to the second embodiment. FIG. 12B is a view for explaining an example of the HUD after the display switching according to the second embodiment.

When determining that a predetermined condition is satisfied based on the information on the vehicle 1A or the information on the surrounding environment of the vehicle 1A, the display control unit 140 according to the second embodiment switches information indicated by the light pattern of the road surface drawing device 142 from a display by the road surface drawing device 142 to a display of the HUD 143.

As shown in FIG. 11, in step S11, the display control unit 140 acquires the information on the vehicle 1A or the information on the surrounding environment of the vehicle 1A from the vehicle control unit 103. Next, in step S12, the display control unit 140 determines whether the predetermined condition is satisfied based on the acquired information. The predetermined condition refers to when it is difficult for the occupant of vehicle 1A to recognize the light pattern drawn on a road surface, when vehicle 1A enters an area where the road surface drawing is not permitted, or when a need for the road surface drawing is low for the occupant of the vehicle 1A.

For example, the display control unit 140 determines that it is difficult for the occupant of the vehicle 1A to recognize the light pattern drawn on the road surface based on the brightness information and the weather information. When a white light pattern is drawn on the road surface, if the road surface is covered with snow, a difference in color between the road surface and the light pattern becomes small, and it becomes difficult for the occupant of the vehicle 1A to recognize the light pattern drawn on the road surface. In a case of heavy rain, since a field of view ahead of the vehicle 1A is poor, it becomes difficult for the occupant of the vehicle 1A to recognize the light pattern drawn on the road surface. When the white light pattern is drawn on the road surface in bright daytime, the difference in color between the road surface and the light pattern becomes small, and it becomes difficult for the occupant of vehicle 1A to recognize the light pattern drawn on the road surface.

For example, the display control unit 140 determines that the vehicle 1A enters the area where the road surface drawing is not permitted (for example, an area other than a vehicle dedicated road) based on the road information. For example, when the vehicle has sovereignty over driving (for example, when the level of the automated driving mode currently known in 2018 is 3 or higher), the display control unit 140 determines that the need for the road surface drawing is low for the occupant of the vehicle 1A based on the driving mode information.

When determining in step S12 that the predetermined condition is satisfied (YES in step S12), the display control unit 140 switches the information indicated by the light pattern of the road surface drawing device 142 from the display by the road surface drawing device 142 to the display of the HUD 143 in step S13.

For example, as shown in FIG. 12A, the vehicle 1A draws the light pattern M0 and the light pattern M1 by the road surface drawing device 142. The light pattern M0 is a light pattern indicating an arrow in a traveling direction of the vehicle 1A. The light pattern M1 is a light pattern indicating information that a pedestrian 101 is approaching from a left side at a distance of 20 m. The light pattern M1 includes a combination of a left-pointing arrow indicating a traveling direction of the pedestrian 101, a mark indicating the pedestrian 101, and characters indicating the distance to the pedestrian 101. In this situation, when determining that the predetermined condition is satisfied based on the information acquired from the vehicle control unit 103, the display control unit 140 causes the HUD 143 to display an image M3 and an image M4 corresponding to the light pattern M0 and the light pattern M1 as shown in FIG. 12B. The display control unit 140 controls the road surface drawing device 142 to stop the road surface drawing. The image M4 displays a figure that is partially different from the light pattern M1 (that is, a figure of a mark indicating the pedestrian is different), but may display a figure the same as the light pattern M1. As shown in FIG. 12B, the HUD 143 may display the vehicle traveling information such as speed information M2 before the display switching in step S13.

When determining in step S12 that the predetermined condition is not satisfied (NO in step S12), the display control unit 140 continues the display of the road surface drawing device 142. The display control unit 140 may periodically acquire the information on the vehicle 1A or the information on the surrounding environment of the vehicle 1A and perform the display switching control. After switching to the display of the HUD 143 in step S13, when determining that the predetermined condition is not satisfied, the display control unit 140 may switch to the display by the road surface drawing device 142 again.

In this way, the display control unit 140 causes the HUD 143 to display the information displayed by the road surface drawing device 142 based on the information on the vehicle 1A or the information on the surrounding environment of the vehicle 1A. Therefore, when it is difficult for the occupant to recognize the information displayed by the road surface drawing device 142, the information can be displayed on the HUD 143. This makes it possible to further improve visibility of the information presented by the vehicle 1A to the occupant.

The display control unit 140 causes the HUD 143 to display the information displayed by the road surface drawing device 142 based on the driving mode of the vehicle 1A. Therefore, the display device can be switched according to a level of the driving mode.

The display control unit 140 causes the HUD 143 to display the information displayed by the road surface drawing device 142 based on the brightness information of the surrounding environment, the road information on the road on which the vehicle is currently traveling, or the weather information at the current position of the vehicle. Therefore, the display device can be switched according to a situation of the surrounding environment of the own vehicle.

Third Embodiment

Figure 13:
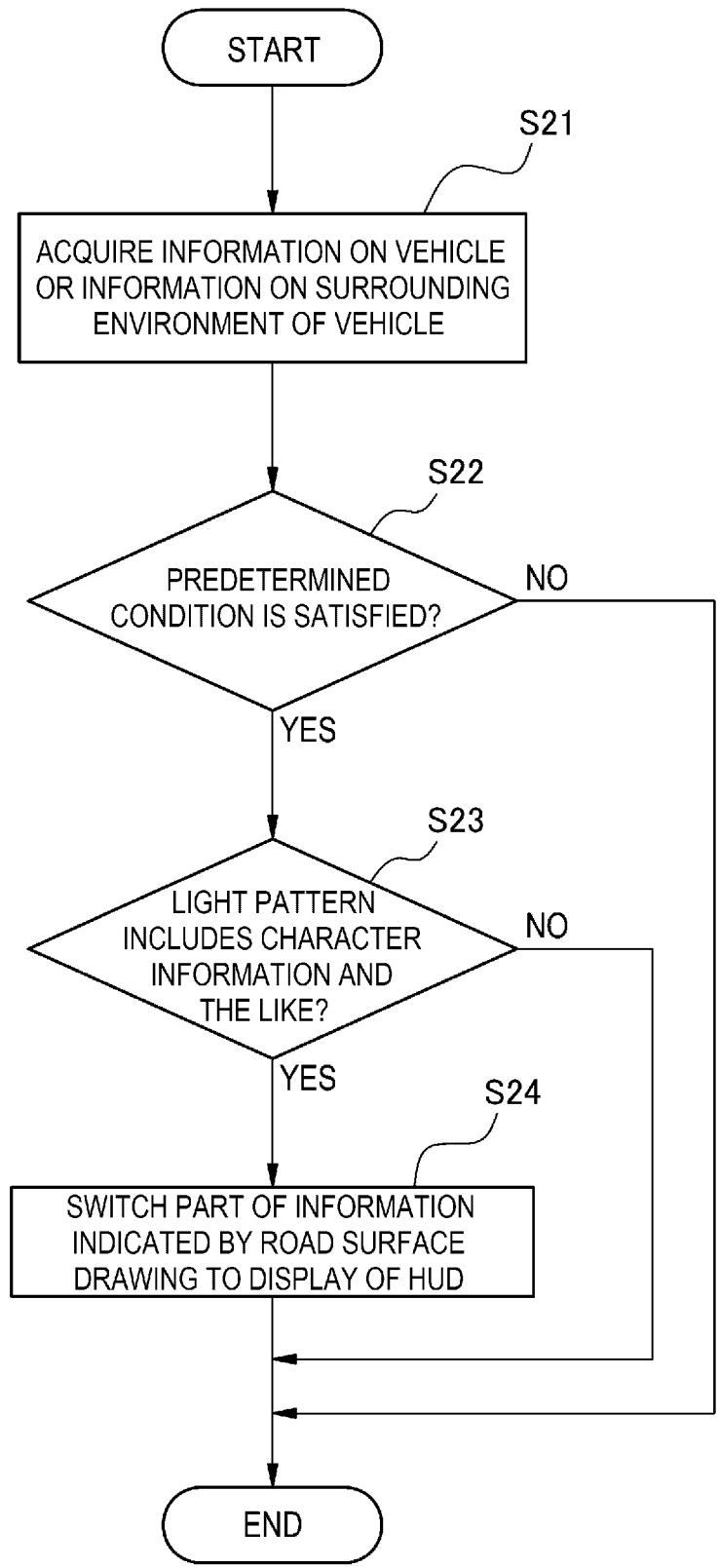
FIG. 13 is a flowchart for explaining an example of display switching control by a display control unit according to a third embodiment of the present invention.
Figure 14:
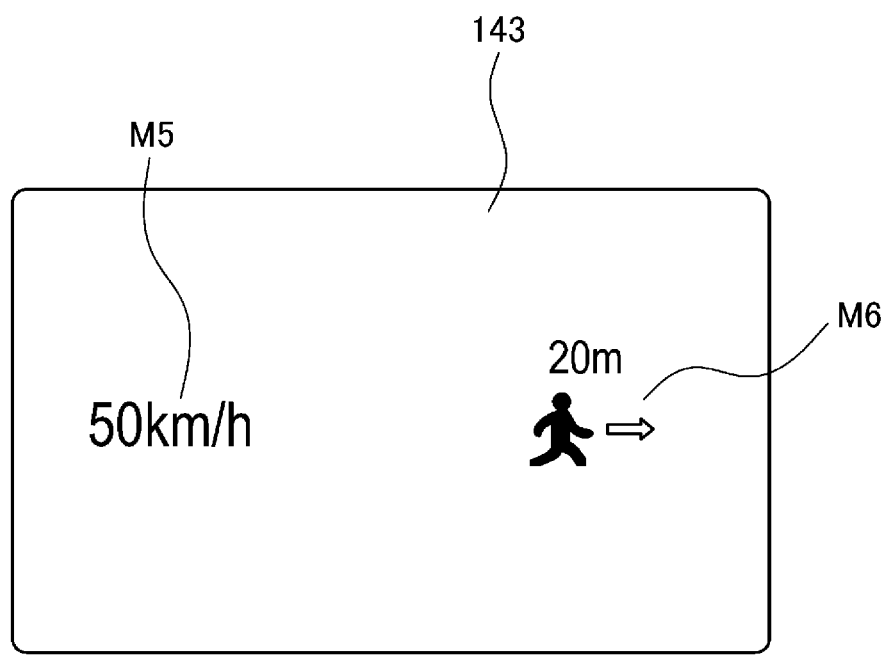
FIG. 14 is a view for explaining an example of a HUD after display switching according to the third embodiment.

Next, an example of display switching control of the display control unit 140 according to a third embodiment of the present invention (hereinafter, referred to as the third embodiment) will be described with reference to FIGS. 13 and 14. FIG. 13 is a flowchart for explaining the example of the display switching control by the display control unit according to the third embodiment. FIG. 14 is a view for explaining an example of a HUD after the display switching according to the third embodiment.

When determining that a predetermined condition is satisfied based on information on the vehicle 1A or information on a surrounding environment of the vehicle 1A, the display control unit 140 according to the second embodiment switches all information indicated by a light pattern of the road surface drawing device 142 from a display by the road surface drawing device 142 to a display of the HUD 143. In contrast, when determining that the predetermined condition is satisfied based on the information on the vehicle 1A or the information on the surrounding environment of the vehicle 1A, the display control unit 140 according to the third embodiment switches a part of the information indicated by the light pattern of the road surface drawing device 142 from the display by the road surface drawing device 142 to the display of the HUD 143.

The present embodiment will describe a case where the display control unit 140 switches to the display of the HUD 143 only the information that is difficult to recognize as the light pattern (for example, character information and relatively fine graphic information) in the information indicated by the light pattern of the road surface drawing device 142.

As shown in FIG. 13, in step S21, the display control unit 140 acquires the information on the vehicle 1A or the information on the surrounding environment of the vehicle 1A from the vehicle control unit 103. Next, in step S22, the display control unit 140 determines whether the predetermined condition is satisfied based on the acquired information. The predetermined condition refers to, for example, when it is difficult for an occupant of the vehicle 1A to recognize the road surface drawing pattern.

For example, the display control unit 140 determines that it is difficult for the occupant of the vehicle 1A to recognize the light pattern drawn on the road surface based on brightness information and weather information. When a white light pattern is drawn on the road surface, if the road surface is covered with snow, a difference in color between the road surface and the light pattern becomes small, and it becomes difficult for the occupant of the vehicle 1A to recognize the light pattern drawn on the road surface. In a case of heavy rain, since a field of view ahead of the vehicle 1A is poor, it becomes difficult for the occupant of the vehicle 1A to recognize the light pattern drawn on the road surface. When the white light pattern is drawn on the road surface in bright daytime, the difference in color between the road surface and the light pattern becomes small, and it becomes difficult for the occupant of vehicle 1A to recognize the light pattern drawn on the road surface. A set value serving as a criterion for determining the predetermined condition is set so as to be looser than the condition of the second embodiment. For example, the set value such as an amount of snowfall, an amount of rainfall or an illuminance is set to be smaller than a set value of the second embodiment.

When determining in step S22 that the predetermined condition is satisfied (YES in step S22), the display control unit 140 determines whether the information that is difficult to recognize as the light pattern (for example, the character information and the relatively fine graphic information) is included in the information indicated by the light pattern of the road surface drawing device 142 in step S23. For example, the information that is difficult to recognize as the light pattern is registered in advance in a memory of the display control unit 140, and the display control unit 140 determines whether the information registered in the memory is included in the information of the light pattern. Alternatively, the display control unit 140 may display the light pattern drawn by the road surface drawing device 142 on the HUD 143 or the like, and the occupant of the vehicle 1A may select the light pattern for performing the display switching.

When determining in step S23 that the information that is difficult to recognize as the light pattern is included (YES in step S23), the display control unit 140 switches only the information that is difficult to be recognized as the light pattern from the display by the road surface drawing device 142 to the display of the HUD 143 in step S24.

For example, as shown in FIG. 12A, the vehicle 1A draws the light pattern M0 and the light pattern M1 by the road surface drawing device 142. In this situation, when determining that the predetermined condition is satisfied based on the information acquired from the vehicle control unit 103, the display control unit 140 determines whether the information that is difficult to recognize as the light pattern (for example, the character information and the relatively fine graphic information) is included. In the light pattern in FIG. 12A, the light pattern M1 includes the character information (characters indicating a distance to the pedestrian 101) and the relatively fine graphic information (a mark indicating the pedestrian 101). Therefore, the display control unit 140 causes the HUD 143 to display an image M6 corresponding to the light pattern M1. The display control unit 140 causes the road surface drawing device 142 to continue drawing the light pattern M0. The image M6 displays a figure that is partially different from the light pattern M1 (that is, a figure of a mark indicating the pedestrian is different), but may display a figure the same as the light pattern M1. As shown in FIG. 14, the HUD 143 may display vehicle traveling information such as speed information M5 before the display switching in step S24.

When determining in step S22 that the predetermined condition is not satisfied (NO in step S22), the display control unit 140 continues the display of the road surface drawing device 142. When determining in step S23 that the information that is difficult to recognize as the light pattern is not included (NO in step S23), the display control unit 140 continues the display of the road surface drawing device 142. The display control unit 140 may periodically acquire the information on the vehicle 1A or the information on the surrounding environment of the vehicle 1A and perform the display switching control. After switching to the display of the HUD 143 in step S24, when determining that the predetermined condition is not satisfied, the display control unit 140 may switch to the display by the road surface drawing device 142 again.

In this way, the display control unit 140 causes the HUD 143 to display a part of the information displayed by the road surface drawing device 142 based on the information on the vehicle 1A or the information on the surrounding environment of the vehicle 1A. Therefore, the information that is difficult for the occupant to recognize in the information displayed by the road surface drawing device 142 can be displayed on the HUD 143. This makes it possible to further improve visibility of the information presented by the vehicle 1A to the occupant.

The display control unit 140 causes the HUD 143 to display the information displayed by the road surface drawing device 142 based on the brightness information of the surrounding environment or the weather information at a current position of the vehicle. Therefore, the display device can be switched according to a situation of the surrounding environment of the own vehicle.

Fourth Embodiment

Figure 15:
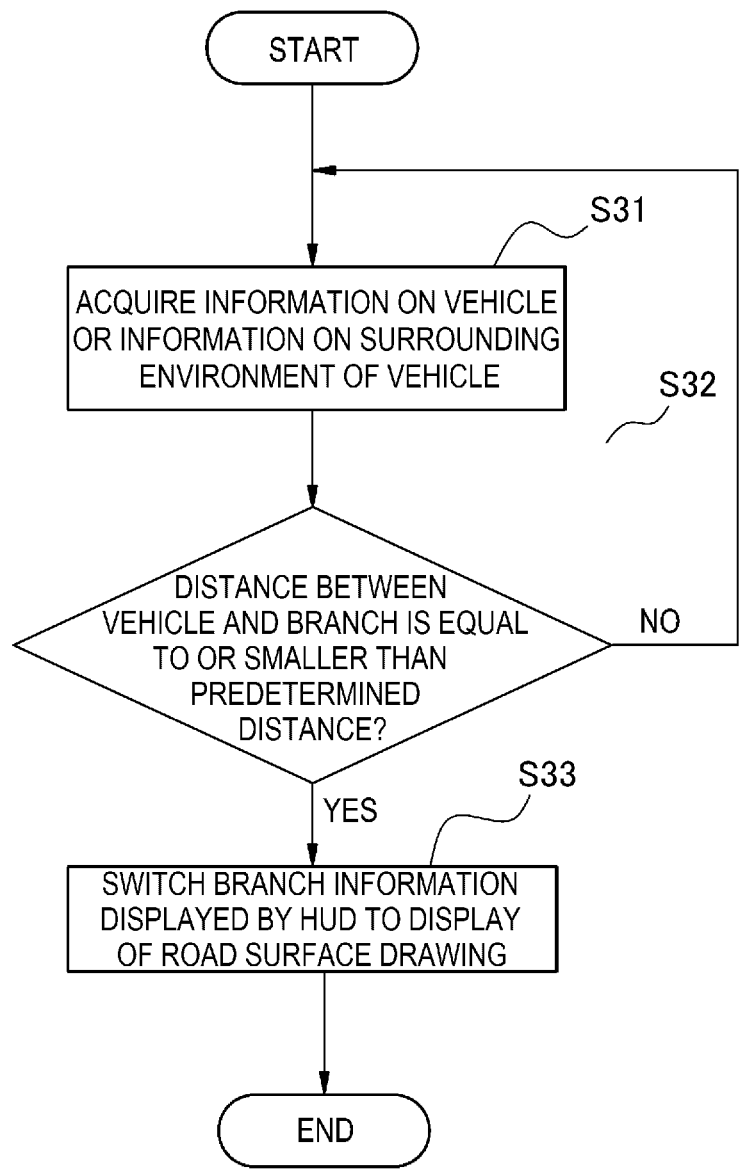
FIG. 15 is a flowchart for explaining an example of display switching control by a display control unit according to a fourth embodiment of the present invention.
Figure 16A:
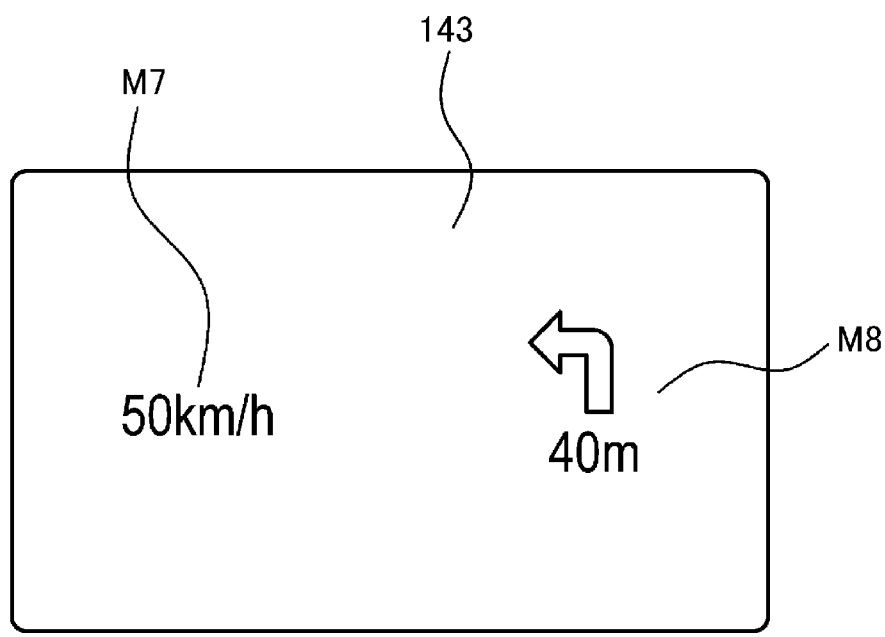
FIG. 16A is a view for explaining an example of a HUD before display switching according to the fourth embodiment.
Figure 16B:
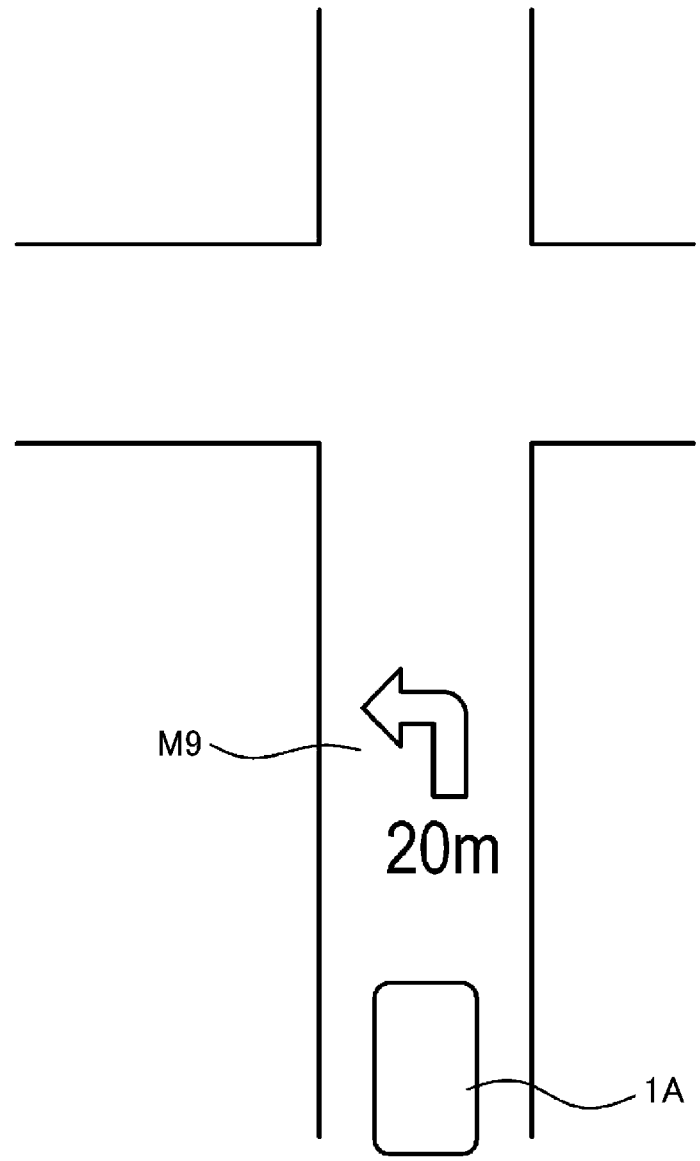
FIG. 16B is a view for explaining an example of road surface drawing after the display switching according to the fourth embodiment.

Next, an example of display switching control of the display control unit 140 according to a fourth embodiment of the present invention (hereinafter, referred to as the fourth embodiment) will be described with reference to FIGS. 15 to 16B. FIG. 15 is a flowchart for explaining the example of the display switching control by the display control unit according to the fourth embodiment. FIG. 16A is a view for explaining an example of a HUD before display switching according to the fourth embodiment. FIG. 16B is a view for explaining an example of road surface drawing after the display switching according to the fourth embodiment.

In the first, second and third embodiments, when determining that a predetermined condition is satisfied based on information on the vehicle 1A or information on a surrounding environment of the vehicle 1A, the display control unit 140 all or a part of information indicated by a light pattern of the road surface drawing device 142 from a display by the road surface drawing device 142 to a display of the HUD 143. In contrast, when determining that the predetermined condition is satisfied based on the information on the vehicle 1A or the information on the surrounding environment of the vehicle 1A, the display control unit 140 according to the fourth embodiment switches all or a part of information displayed by the HUD 143 to the display of the road surface drawing device 142.

In the present embodiment will describe a case where when a distance between the vehicle 1A and a branch point of roads ahead (hereafter, referred to as a distance between the vehicle 1A and a branch) is equal to or smaller than a predetermined distance, it is determined that the predetermined condition is satisfied, and branch information displayed by the HUD 143 is switched to the display of the road surface drawing device 142.

As shown in FIG. 15, in step S31, the display control unit 140 acquires the information on the vehicle 1A or the information on the surrounding environment of the vehicle 1A (for example, current position information and map information) from the vehicle control unit 103. Next, in step S32, the display control unit 140 determines whether the distance between the vehicle 1A and the branch is equal to or smaller than the predetermined distance based on the acquired information.

For example, when the distance between the vehicle 1A and the branch is larger than the predetermined distance (for example, 30 M), the display control unit 140 determines that the display by the HUD is preferable, and when the distance between the vehicle and the branch is equal to or smaller than the predetermined distance, the display control unit 140 determines that the display by road surface drawing is preferable. A set value of the predetermined distance may be set in advance before shipment of the vehicle 1A or may be appropriately set by an occupant of the vehicle 1A.

When determining in step S32 that the distance between the vehicle 1A and the branch is equal to or smaller than the predetermined distance (YES in step S32), the display control unit 140 switches the branch information displayed by the HUD 143 to the display of the road surface drawing device 142 in step S33.

As shown in FIG. 16A, the vehicle 1A displays speed information M7 and branch information M8 by the HUD 143. The branch information M8 includes a combination of characters indicating a distance to the branch and an arrow in a traveling direction. The branch information M8 indicates that the vehicle will turn left 40 m ahead. In this situation, when determining that the distance between the vehicle 1A and the branch is equal to or smaller than the predetermined distance based on the information acquired from the vehicle control unit 103, the display control unit 140 causes the road surface drawing device 142 to emit a light pattern M9 corresponding to the branch information M8 as shown in FIG. 16B. The display control unit 140 controls the HUD 143 to stop displaying the branch information M8. The branch information M8 may include an image of the roads including the branch in addition to the characters indicating the distance to the branch and the arrow in the traveling direction.

When determining in step S32 that the distance between the vehicle 1A and the branch is not equal to or smaller than the predetermined distance (NO in step S32), the display control unit 140 continues the display of the HUD 143 and returns to step S31. When NO is determined in step S32, the display switching control may end without returning to step S31.

The present embodiment has described the case where when the distance between the vehicle 1A and the branch is equal to or smaller than the predetermined distance, the branch information displayed by the HUD 143 is switched to the display of the road surface drawing device 142, but the present invention is not limited thereto. When the predetermined condition is satisfied, the display control unit 140 also switches information other than the branch information from the display of the HUD 143 to the display of the road surface drawing device 142. For example, when the vehicle enters an area where the road surface drawing is permitted (for example, a vehicle dedicated road), all or a part of the information displayed on the HUD 143 may be switched to the display of the road surface drawing device 142. When a level of an automated driving mode currently known in 2018 is 2 or lower (the occupant has sovereignty over driving), all or a part of the information displayed on the HUD 143 may be switched to the display of the road surface drawing device 142. In a case of nighttime (for example, when the road surface drawing is easily recognized due to a contrast between a road surface and a light pattern), all or a part of the information displayed on the HUD 143 may be switched to the display of the road surface drawing device 142.

In this way, the display control unit 140 causes the road surface drawing device 142 to display all or a part of the information displayed by the HUD 143 based on the information on the vehicle 1A or the information on the surrounding environment of the vehicle 1A. Therefore, the information that is difficult for the occupant to recognize in the information displayed by the HUD 143 can be displayed by the road surface drawing device 142. This makes it possible to further improve visibility of the information presented by the vehicle 1A to the occupant.

The display control unit 140 causes the road surface drawing device 142 to display the information displayed by the HUD 143 based on a driving mode of the vehicle 1A. Therefore, the display device can be switched according to a level of the driving mode.

The display control unit 140 causes the road surface drawing device 142 to display the information displayed by the HUD 143 based on brightness information of the surrounding environment, road information on the road on which the vehicle is currently traveling, or weather information at a current position of the vehicle. Therefore, the display device can be switched according to a situation of the surrounding environment of the own vehicle.

Although the embodiments of the present invention have been described above, it is needless to say that the technical scope of the present invention should not be interpreted as being limited to the description of the embodiments. It is to be understood by those skilled in the art that the present embodiments are merely examples and various modifications can be made within the scope of the invention described in the claims. The technical scope of the present invention should be determined based on the scope of the invention described in the claims and an equivalent scope thereof.

In the present embodiments, a driving mode of the vehicle is described as including the fully automated driving mode, the advanced driving support mode, the driving support mode and the manual driving mode, but the driving mode of the vehicle should not be limited to these four modes. Classification of the driving mode of the vehicle may be appropriately changed according to laws or regulations related to automated driving in each country. Similarly, definitions of the "fully automated driving mode", the "advanced driving support mode" and the "driving support mode" in the description of the present embodiments are merely examples and may be appropriately changed according to the laws or regulations related to the automated driving in each country.

The present application appropriately cites the contents disclosed in Japanese Patent Application No. 2018-147734 filed on Aug. 6, 2018 and the contents disclosed in Japanese Patent Application No. 2018-152957 filed on Aug. 15, 2018.

The invention claimed is:

1. A vehicle display system provided in a vehicle, the vehicle display system comprising:
   a first display device located inside the vehicle and configured to display a surrounding environment image indicating a surrounding environment of the vehicle on a window of the vehicle; and
   a display control unit configured to, according to a predetermined condition associated with the vehicle or the surrounding environment of the vehicle, control the first display device such that the surrounding environment image instead of a field of view visible to an occupant through the window is displayed on the window and lower a transmittance of the window.

2. The vehicle display system according to claim 1, wherein the first display device is configured to display the surrounding environment image of a traveling direction of the vehicle on a front window of the vehicle.

3. The vehicle display system according to claim 1, wherein the first display device is configured to display the surrounding environment image on all windows of the vehicle and lower a transmittance of each of all the windows.

4. The vehicle display system according to claim 1, further comprising:
   a second display device configured to emit a light pattern toward a road surface outside the vehicle,
   wherein when the second display device emits the light pattern toward the road surface, the display control unit controls the first display device such that the surrounding environment image is displayed on the window, and lowers the transmittance of the window.

5. The vehicle display system according to claim 1, wherein the display control unit controls the first display device such that the surrounding environment image is displayed on the window and lowers the transmittance of the window according to a driving mode of the vehicle.

6. The vehicle display system according to claim 1, wherein the display control unit controls the first display device such that the surrounding environment image is displayed on the window and lowers the transmittance of the window according to a brightness of the surrounding environment of the vehicle.

7. The vehicle display system according to claim 1, wherein the display control unit controls the first display device such that the surrounding environment image is displayed on the window and lowers the transmittance of the window according to a road on which the vehicle is currently traveling.

8. The vehicle display system according to claim 1, wherein the display control unit controls the first display device such that the surrounding environment image is displayed on the window and lowers the transmittance of the window according to weather at a current position of the vehicle.

9. A vehicle comprising: the vehicle display system according to claim 1.

10. A vehicle display system provided in a vehicle, the vehicle display system comprising:
    a first display device configured to emit a light pattern indicating predetermined information toward a road surface outside the vehicle;

a second display device located inside the vehicle and configured to display vehicle traveling information on traveling of the vehicle toward an occupant of the vehicle such that the vehicle traveling information is superimposed on a real space outside the vehicle; and a display control unit configured to, based on information on the vehicle or information on a surrounding environment of the vehicle, stop displaying of the predetermined information by the first display device and switch displaying of the predetermined information to the second display device, or stop displaying of the vehicle traveling information by the second display device and switch displaying of the vehicle traveling information to the first display device.

11. The vehicle display system according to claim 10, wherein the display control unit causes the second display device to display the predetermined information based on the information on the vehicle or the information on the surrounding environment of the vehicle.

12. The vehicle display system according to claim 10, wherein the display control unit causes the first display device to display the vehicle traveling information based on the information on the vehicle or the information on the surrounding environment of the vehicle.

13. The vehicle display system according to claim 10, wherein the display control unit causes the second display device to display a part of the predetermined information based on the information on the vehicle or the information on the surrounding environment of the vehicle.

14. The vehicle display system according to claim 10, wherein the information on the vehicle refers to information on a driving mode of the vehicle.

15. The vehicle display system according to claim 10, wherein the information on the surrounding environment of the vehicle refers to brightness information of the surrounding environment, road information on the road on which the vehicle is currently traveling, or weather information at a current position of the vehicle.

* * * * *